US012771617B2

(12) United States Patent
Mansour et al.

(10) Patent No.: US 12,771,617 B2
(45) Date of Patent: Oct. 20, 2026

(54) MULTI-CRITERIA REINFORCEMENT LEARNING-BASED ADMISSION CONTROL IN PRIVATE NETWORKS

(71) Applicant: Dell Products L.P., Round Rock, TX (US)

(72) Inventors: Marwan Mansour, Alexandria (EG); Ramy Atawia, Kanata (CA); Amro Abdalla, Port Saeid (EG); Joyce Tawfik, Heliopolis (EG)

(73) Assignee: DELL PRODUCTS L.P., Round Rock, TX (US)

( * ) Notice: Subject to any disclaimer, the term of this patent is extended or adjusted under 35 U.S.C. 154(b) by 642 days.

(21) Appl. No.: 18/316,431

(22) Filed: May 12, 2023

(65) Prior Publication Data

US 2024/0380671 A1 Nov. 14, 2024

(51) Int. Cl.

| | |
|---|---|
| ***H04L 41/14*** | (2022.01) |
| ***G06Q 10/0639*** | (2023.01) |
| ***H04L 41/147*** | (2022.01) |
| ***H04L 41/5003*** | (2022.01) |

(52) U.S. Cl.

CPC ..... *H04L 41/145* (2013.01); *G06Q 10/06393* (2013.01); *H04L 41/147* (2013.01); *H04L 41/5003* (2013.01)

(58) Field of Classification Search

CPC . H04L 41/145; H04L 41/147; H04L 41/5003; H06Q 10/06393

See application file for complete search history.

(56) References Cited

U.S. PATENT DOCUMENTS

2022/0231912 A1 7/2022 Jeong et al.

OTHER PUBLICATIONS

Troia, et al., "Admission Control and Virtual Network Embedding in 5G Networks: A Deep Reinforcement-Learning Approach," Published in: IEEE Access (vol. 10), Date of Publication: Feb. 1, 2022, DOI: 10.1109/ACCESS.2022.3148703.

Caballero, et al., "Network Slicing for Guaranteed Rate Services: Admission Control and Resource Allocation Games," Published in: IEEE Transactions on Wireless Communications (vol. 17, Issue: 10, Oct. 2018), Date of Publication: Aug. 2, 2018, DOI: 10.1109/TWC.2018.2859918.

(Continued)

*Primary Examiner* — James P Duffy

(74) *Attorney, Agent, or Firm* — Amin, Turocy & Watson, LLP

(57) ABSTRACT

Technology described herein can comprise a system comprising a processor and a memory that stores executable instructions that, when executed by the processor, facilitate performance of operations, comprising requesting, via a prediction process executed by the system, a subscription to a quality of service flow of a private network, based on a key performance indicator report received from a node of the private network, defining, via the prediction process, a reward function that determines a quantified reward based on a level of satisfaction corresponding to at least one key performance indicator for the node, and based on the reward function, identifying, via a decision process executed by the system, an action, corresponding to a predicted threshold for the level of satisfaction of the at least one key performance indicator, to be performed to respond to a request for admission to the private network from a user equipment.

20 Claims, 16 Drawing Sheets

(56) References Cited

OTHER PUBLICATIONS

Mansour, et al., "Artificial Intelligence Based Admission Control in Multi-Vendor O-RAN," U.S. Appl. No. 17/811,415, filed Jul. 8, 2022.
International Search Report and Written Opinion received for PCT Application Serial No. PCT/US2023/036183 dated Feb. 15, 2024, 16 pages.
Polese et al., "Understanding O-RAN: Architecture, Interfaces, Algorithms, Security, and Research Challenges", IEEE Communications Surveys & Tutorials, vol. 25, No. 2, 2023, pp. 1376-1411.
ETSI "5G; NR; NR and NG-RAN Overall Description Stage-2 (3GPP TS 38.300 Version 16.12.0 Release 16" ETSI, 156 pages.
ETSI "Experiential Networked Intelligence (ENI); Processing and Management of Intent Policy" ETSI, Dec. 2023, https://view.officeapps.live.com/op/view.aspx?src=https%3A%2F%2Fdocbox.etsi.org%2FISG%2FENI%2FOpen%2FENI015%2FENI0015v411v018.docx&wdOrigin=BROWSELINK, Last Accessed May 6, 2024, 28 pages.
International Preliminary Report on Patentability received for PCT Application Serial No. PCT/US2023/036183 dated Nov. 27, 2025, 9 pages.

900

MULTI-CRITERIA REINFORCEMENT LEARNING-BASED ADMISSION CONTROL IN PRIVATE NETWORKS

BACKGROUND

Modern private cellular systems, such as fifth generation (5G) networks, continue to advance, where vertical applications are expected to follow asymmetric and aperiodic traffic patterns resulting in time-variable and unpredictable traffic load metrics relative to existing admission control frameworks. Continued use of such existing frameworks can result in an inability to maintain key performance indicators that benefit, are expected and/or are contracted for by user entities of a private network, thus providing for an inability to satisfy performance expectations of user entities.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for reinforcement learning for admission control in private 5G-based networks, on a per-quality of service flow basis, using reward functions that reflect the ability of the respective nodes to serve new services and which reflect the impact of new admissions on existing traffic being served by each quality of service flow.

An example system can comprise a processor, and a memory that stores executable instructions that, when executed by the processor, facilitate performance of operations, comprising requesting, via a prediction process executed by the system, a subscription to a quality of service flow of a private network, based on a key performance indicator report received from a node of the private network, defining, via the prediction process, a reward function that determines a quantified reward based on a level of satisfaction corresponding to at least one key performance indicator for the node, and based on the reward function, identifying, via a decision process executed by the system, an action, corresponding to a predicted threshold for the level of satisfaction of the at least one key performance indicator, to be performed to respond to a request for admission to the private network from a user equipment.

An example method can comprise for an individual request for authorized admission to a private network for a user entity, requesting, by a system comprising a processor, a subscription to a quality of service flow of the private network, based on a key performance indicator report received from a node of the private network, defining, by the system, a reward function that outputs a quantified reward based on a predicted resultant state of the node that is predicted to result from implementation of an action in response to the request for the authorized admission, and communicating, by the system, a recommendation of the action to the node based on selection of the action as predicted to maintain or increase a performance metric associated with the current state of the node.

An example non-transitory machine-readable medium, can comprise executable instructions that, when executed by a processor facilitate performance of operations, comprising obtaining, from a user equipment associated with a user entity, an admission request for the user equipment to have access to a quality of service flow associated with a private network, analyzing a set of network load parameters and a set of key performance indicators for the quality of service flow, based on a result of the analyzing, determining a network load parameter, of the set of network load parameters, having a degree of correlation satisfying a key process indicator threshold, based on the network load parameter, defining a reward function that returns a quantified reward based on a level of satisfaction of the set of key performance indicators, based on the reward function, predicting, using an artificial intelligence model, a set of one or more actions employable for response to the admission request, which set of actions predictively enable the network load parameter to be achieved for the quality of service flow.

An advantage of the one or more embodiments of the aforementioned system, method and/or non-transitory machine-readable medium can be allowing for dynamic control of admission control, even for a private network, absent initial information defining user entities. This dynamic control can be performed individually per request for admission to the private network in a manner that can optimize (e.g., increase and/or maintain) a state of key performance indicators of a quality service flow of the network. such as when a network comprises multi-vendors and/or components of multi-vendors.

Another advantage of these one or more processes can be a learned approach to admission control, absent use of static and fixed thresholds, thus accounting for dynamic conditions of a network and/or dynamic changes to user entity permissions, priorities and/or the like.

Still another advantage of these one or more processes can be dynamic control that is adapted to different permissions, priorities and/or the like of different user entities.

In one or more embodiments of the aforementioned system, method and/or non-transitory machine-readable medium a machine learning model, such as a reinforcement learning-based model, can be employed to predict a set of actions employable for response to the admission request by a user equipment (UE) associated with the user entity. The predicted set of actions can be those that are predicted to enable one or more selected network load parameters to be achieved for a quality of service flow of the private network.

An advantage of this system, method and/or non-transitory machine-readable medium can be an ability to leverage large quantities of simulated data for network load parameters corresponding to specified levels of resultant KPI's based on the network load parameters and to apply such simulated learning to dynamically changing real-time conditions on a per-QoS and/or per-UE admission request basis. This is in contrast to existing use of static occupancy quantities or static physical resource block (PRB) utilization levels which do not correlate to the asymmetric and aperiodic traffic patterns of current private networks, such as current 5G networks.

In one or more embodiments of the aforementioned system, method and/or non-transitory machine-readable medium a machine learning model, such as a reinforcement learning-based (RL-based) model, can be trained based on a simulated set of network parameters and a corresponding simulated set of KPIs. The RL-based model can be optimized based on dynamically changing states of real-time QoS flows of a private network to adjust the correspondences between the learned set of network parameters and the learned set of KPIs.

An advantage of this system, method and/or non-transitory machine-readable medium can be an ability to dynamically optimize a decision process (e.g., action selection process) employed to output the one or more predicted actions that can achieve a best reward for corresponding reward functions based on current, and dynamically changing, network parameters and KPIs. This dynamic optimization can allow for improvement to the system itself, allowing for achievement of higher rewards, which can be achieved on a per-QoS and/or per-UE basis.

BRIEF DESCRIPTION OF THE DRAWINGS

The technology described herein is illustrated by way of example and is not limited by the accompanying figures, in which like reference numerals indicate similar elements.

DETAILED DESCRIPTION

Overview

Figure 1:
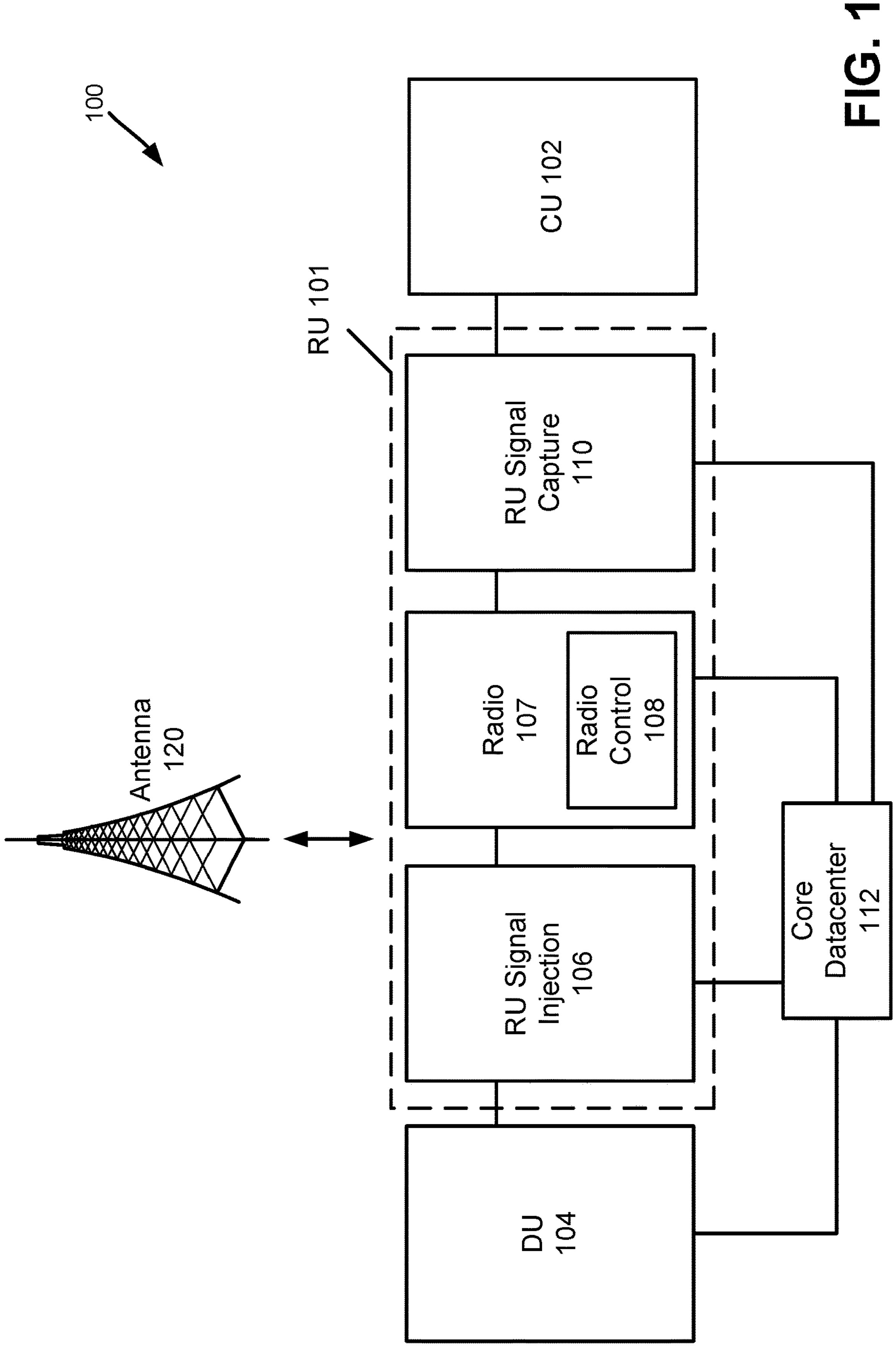
FIG. 1 illustrates a schematic representation of example elements of a private network, in accordance with one or more embodiments and/or implementations described herein.

As mentioned, continued use of existing frameworks (those implicating asymmetric and aperiodic traffic patterns resulting in time-variable and unpredictable traffic load metrics) can result in the inability to maintain key performance indicators that benefit, are expected and/or are contracted for by user entities of a private network, thus providing for the inability to satisfy performance expectations of user entities. Therefore, it can be desired to determine solutions to such expected increase in applications and use of private 5G networks (and beyond 5G), which solutions can adapt dynamically with changes to the key performance indicators of individual quality of service flows of such private networks. In this regard, the technology described herein is generally directed towards a process to provide admission control to a private network, such as a private 5G network, which admission control can be dynamic relative to network conditions and/or variables, and/or which network control can be dynamic relative to different user entities on and/or not yet on the private network. The admission control further can be specific to individual quality of service (QOS) flows of the private network and/or to individual user equipments (UEs).

As used herein, admission control refers to deciding whether a certain user equipment (UE) shall be connected to the network or not. The decision is conventionally taken using a predefined criteria such as load (e.g., number of users or physical resource block (PRB) utilization level). PRBs can be employed for transmission and/or reception, for example.

Conventional approaches assume static spectrum allocation, and fixed relation between load and service level agreement (SLA) on the one hand, and admission control thresholds on the other hand. An SLA can define availability, reliability and/or performance requirements of a system. For example, the number of users can be selected to represent the cell load at which cell target KPIs can be maintained, and typically is decided by operators of the private network based on domain knowledge during the deployment phase.

These conventional approaches can be problematic and are not expected to hold true as private 5G networks grow in size and are used by user entities with multiple user equipments each. Indeed, such private 5G networks are expected to incur aperiodic and/or asymmetric traffic resulting in time-varied and unpredictable traffic load metrics as compared to those conventionally utilized. As a result, this can affect quality of service (QOS) satisfaction levels that are required, expected and/or contracted for by user entities.

For example, the heterogenous traffic in private 5G networks (e.g., different packet sizes and inter-arrival time) can be expected to result in different cell loads for different sets each comprising a same number of users. The channel conditions experienced by the user equipments can also further change the per-user demand (e.g., users in bad radio conditions can require more resources) which can cause the fixed number of users to be a suboptimal metric for admission control.

Further, given the difficult predictability of the traffic patterns in private 5G networks, additional challenges are expected to arise in the context of admission control decisions. These challenges can include device channel conditions and traffic demand information being minimally available because the admission decision is taken before UE connection. Accordingly, it can be difficult to accurately predict the incoming UE's effect.

Also, dynamic variations in cell load due to connect users' mobility and demand variation can cause the optimal admission strategy to change accordingly. As such, change in strategy in a time corresponding to the mobility and demand variation to match the UEs' needs can be difficult.

To account for one or more of these deficiencies, one or more systems, methods and/or non-transitory computer readable mediums are defined herein that can employ artificial intelligence and/or reinforcement learning-based admission control to made admission control decisions on a per-quality of service flow basis, using reward functions that reflect the ability of the respective nodes to serve new services and which reflect the impact of new admissions on existing traffic being served by each quality of service flow.

Generally, the proposed framework can adopt reinforcement learning (RL) for admission control decisions in private networks. An RL agent can periodically learn the resource utilization, network topology and QoS data to perform admission control functions in diverse network environments through learning the relationship between network state (e.g., state of KPIs) and corresponding QoS target values.

The framework can employ the following aspects:

Lookahead performance estimation: The impact of the new user on the connected users' QoS satisfaction (e.g., maximum tolerable delay KPI) can be estimated. A new UE can be admitted either when there is no impact on other users' QoS or when the system is still in the exploration phase (e.g., not enough data points to predict impact on connected UEs).

Multi-network awareness: The solution decision can support either admission (when the cell is predicted to satisfy the QoS) or rejection (and possibly re-direction to a public network). A rejection action can consider the availability of other co-located networks that are not managed (no visibility on RRC state or KPIs). The RL agent can optimize its private-public network transitions policy using feedback from UEs offloaded to the public network. "Offloading" refers to private network users rejected and re-directed to a public network.

Dynamic QoS-based reward and states: The framework can calculate one or more correlations between the network load parameters (e.g., PRB utilization, channel conditions) and the QoS metrics (e.g., packet delay), also referred to herein as KPIs. This can allow the system to filter the load parameters that are closely related to the QoS metric of interest. In addition, the framework can employ different criteria for each QoS flow (e.g., as encoded in respective reward functions). Therefore, evaluating each traffic use-case (such as mobile broadband-MBB and ultra reliable and low latency communications-URLLC) independently.

More particularly, the system can employ a reinforcement learning-based (RL-based) model to determine best-choice actions in response to individual requests for admission. The best-choice actions can be based on achievement of network load parameters that satisfy key performance indicators (KPI's) of individual quality of service (QOS) flows of a private network. The best-choice actions can be determined by employing per-QoS flow reward functions that are based on the KPI's and on resultant feedback of states of KPI's of the QoS flows upon execution of the best-choice actions. Feedback collection can allow for optimization of a decision process (e.g., an action selection process) employed by the RL-based model on a per-QoS basis and/or on a per UE basis. Regarding optimization on a per-UE basis, the system can track UE's employing assigned UE IDs for UE beam identifies, absent information defining the UEs (e.g., class, type, traffic requirements, KPI requirements, etc.)

That is, the data collected (e.g., load parameters and KPIs resulting from executed actions) and/or the results of analysis of the data can allow for real-time, immediate, short-term and long-term private network admission control decisions and/or improvements, troubleshooting and/or RL-based decision policy optimizations regarding private network performance, failures, issues, continuity, repeated requests for admission and/or other aspects related to various admissions, or denials thereof, to the private network. For example, the resulting data can be employed for optimizing decision policies on a per-QoS and/or per-UE basis.

It is noted that the embodiments described herein are not limited only to use in private networks or private 5G networks. In this regard, any of the techniques or systems, or examples described herein as being in the private 5G network context can also be applied to any private or non-private, advanced network context, such as new radio (NR) networks, 5G networks, sixth generation (6G) networks and beyond.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, the term "cost" can refer to power, money, memory, processing power, thermal power, size, weight and/or the like.

As used herein, the terms "entity" and "user entity" can refer to a machine, device, smart device, component, hardware, software and/or human.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term “resource” can refer to power, money, memory, processing power and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1500 illustrated at FIG. 15. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio system architecture of an exemplary private network is illustrated at 100. The radio system 100 can comprise a central unit (CU) 102, distributed unit (DU) 104 (also herein referred to as a DU portion 104) and a radio unit (RU) 101. The CU 102 can comprise protocol layers and can be responsible for various protocol stack functions. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. In one or more embodiments, the RU signal capture portion 110 can analyze data captured. The DU portion 104 and RU portion 106 can provide data to, and receive data from, the core datacenter 112.

Figure 2:
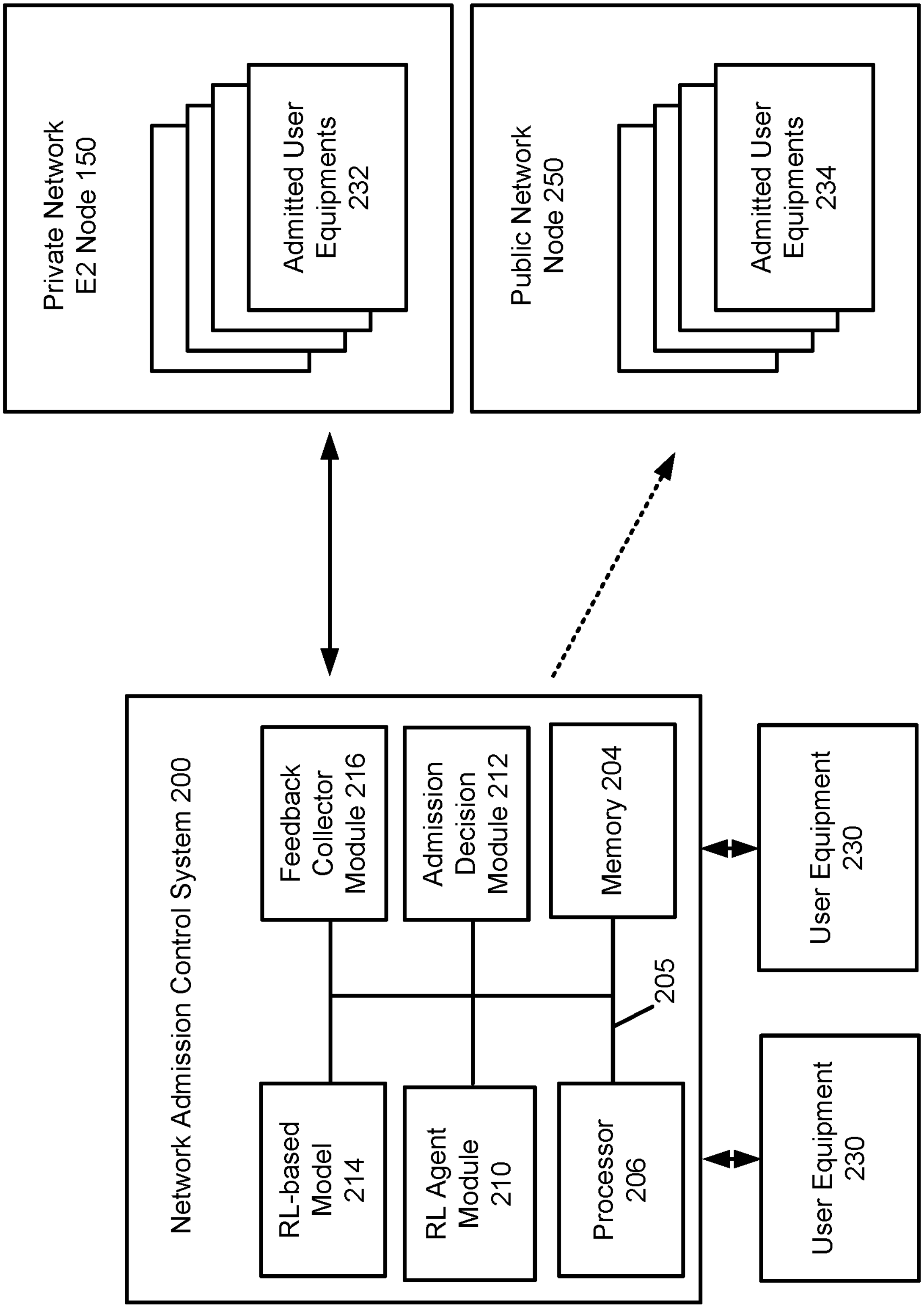
FIG. 2 illustrates a schematic representation of a network admission control system that can be employed to control the private network of FIG. 1, in accordance with one or more embodiments and/or implementations described herein.

Turning next to FIG. 2, an example of an admission control architecture is illustrated as a network admission control system 200. The network admission control system 2200 can be part of the radio system 100 (e.g., of FIG. 1) or can be at least partially or fully external to the radio system 100. For purposes of brevity, additional aspects of the radio system 100 (e.g., as illustrated at FIG. 1) are not illustrated at FIG. 2. While referring here to one or more processes, operations, facilitations and/or uses of the non-limiting system architecture 200, description provided herein, both above and below, also can be relevant to one or more other non-limiting system architectures described herein.

The network admission control system 200 can generally enable and/or reject a request for admission to a private network, such as private 5G network by a user equipment 230 associated with a user entity. As illustrated, the network admission control system 200 can comprise a processor 206, memory 204, bus 205, RL agent module 210, admission decision module 212, RL-based model 214 and/or feedback collector module 216.

Figure 3:
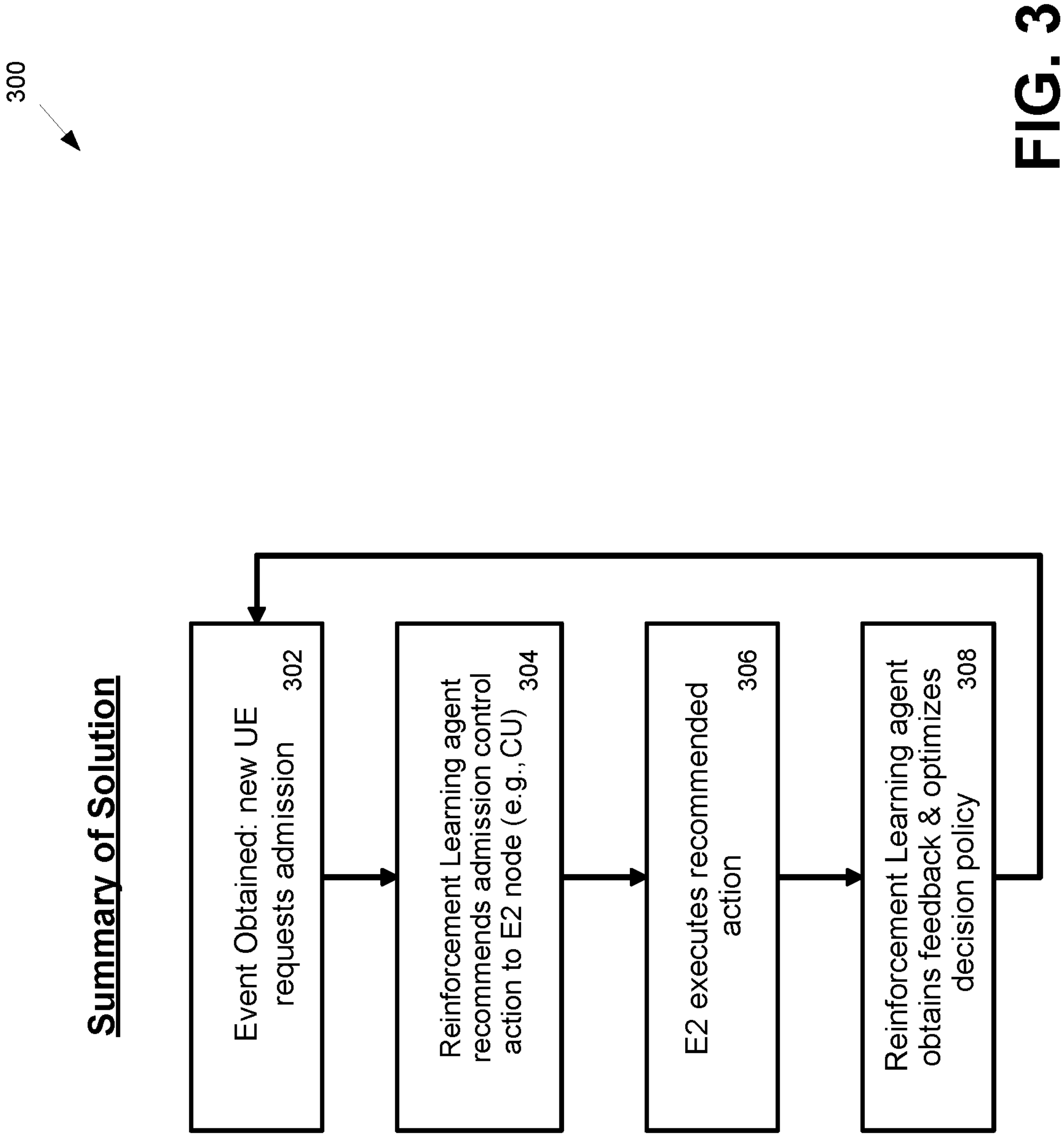
FIG. 3 illustrates a flow diagram of a set of high-level processes that can be performed by the network admission control system of FIG. 2, in accordance with one or more embodiments and/or implementations described herein.

Turning briefly to FIG. 3, a flow diagram 300 of high-level processes that can be performed and/or caused by the network admission control system 200 are set forth. The high-level processes comprise receipt of a new UE request for admission to the private network at process 302. At process 304, the RL agent module 210 (also herein referred to as the RL agent) can recommend an admission control action to the E2 node 150, such as to a CU associated with the E2 node 150. In response, the E2 node 150 can execute the recommended action at process 306. In response to the execution, at process 308, the RL agent module 210 can obtain feedback from the E2 node 150 and can optimize a decision policy employed by the admission decision module 212.

Turning back to FIG. 2, to achieve the high-level processes set forth in FIG. 3, generally, the RL agent module 210 can communicate with the private network E2 node 150, obtain QoS metric/KPI information from the E2 node 150, correlate one or more network load parameters to the KPI information, and determine a reward function that can optimize one or more KPIs based on one or more load parameters. Generally, the RL agent module 210 also can, using the reward function and employing the RL-based model 214, generate a set of one or more recommended actions for being communicated to the E2 node 150 to respond to a request for admission by a UE 230. The admission decision module 212 can transmit and/or otherwise make available a resultant control decision to the E2 node 150. Generally, the feedback collector module 216 can obtain information regarding a state (e.g., resultant KPIs) of the E2 node 150 after execution of an action by the E2 node 150 in response to the request for admission by the UE 230. In response to collected feedback information, the RL-based model 214 can be self-optimized and/or optimized via control by the RL agent module 210.

A more detailed discussion now first turns to the processor 206, memory 204 and bus 205 of the network admission control system 200.

In one or more embodiments, network admission control system 200 can comprise the processor 206 (e.g., computer processing unit, microprocessor, classical processor and/or like processor). In one or more embodiments, a component associated with network admission control system 200, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise the agent module 210, admission decision module 212, RL-based model 214 and/or feedback collector module 216.

The processor 206 can be configured to control one or more components/elements of the network admission control system 200, such as agent module 210, admission decision module 212, RL-based model 214 and/or feedback collector module 216.

In one or more embodiments, the network admission control system 200 can comprise the machine-readable memory 204 that can be operably connected to the processor 206. The memory 204 can store computer-executable instructions that, upon execution by the processor 206, can cause the processor 206 and/or one or more other components of the network admission control system 200 (e.g., agent module 210, admission decision module 212, RL-based model 214 and/or feedback collector module 216) to perform one or more actions. In one or more embodiments, the memory 204 can store one or more computer-executable components.

Network admission control system 200 and/or a component thereof as described herein, can be communicatively, electrically, operatively, optically and/or otherwise coupled to one another via a bus 205 to perform functions of non-limiting system architecture 100, network admission control system 200 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, network admission control system 200 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 206 and/or memory 204 described above, network admission control system 200 can comprise one or more computer and/or machine readable, writable and/or executable components and/or instructions that, when executed by processor 206, can facilitate performance of one or more operations defined by such component(s) and/or instruction(s).

Figure 4:
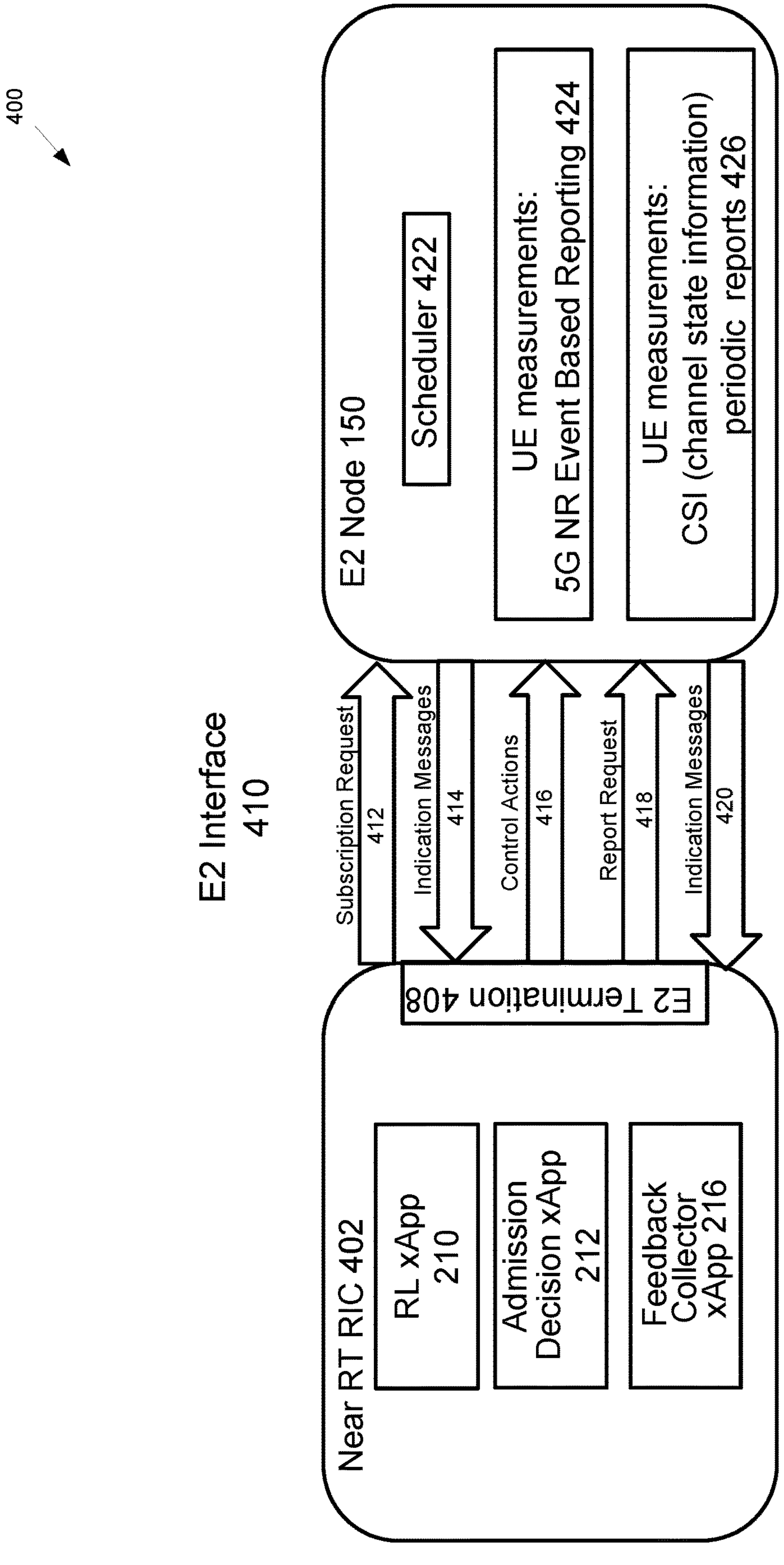
FIG. 4 illustrates a partial schematic diagram of interactions between the network admission control system of FIG. 2 and a portion of the private network of FIG. 1, in accordance with one or more embodiments and/or implementations described herein.
Figure 5:
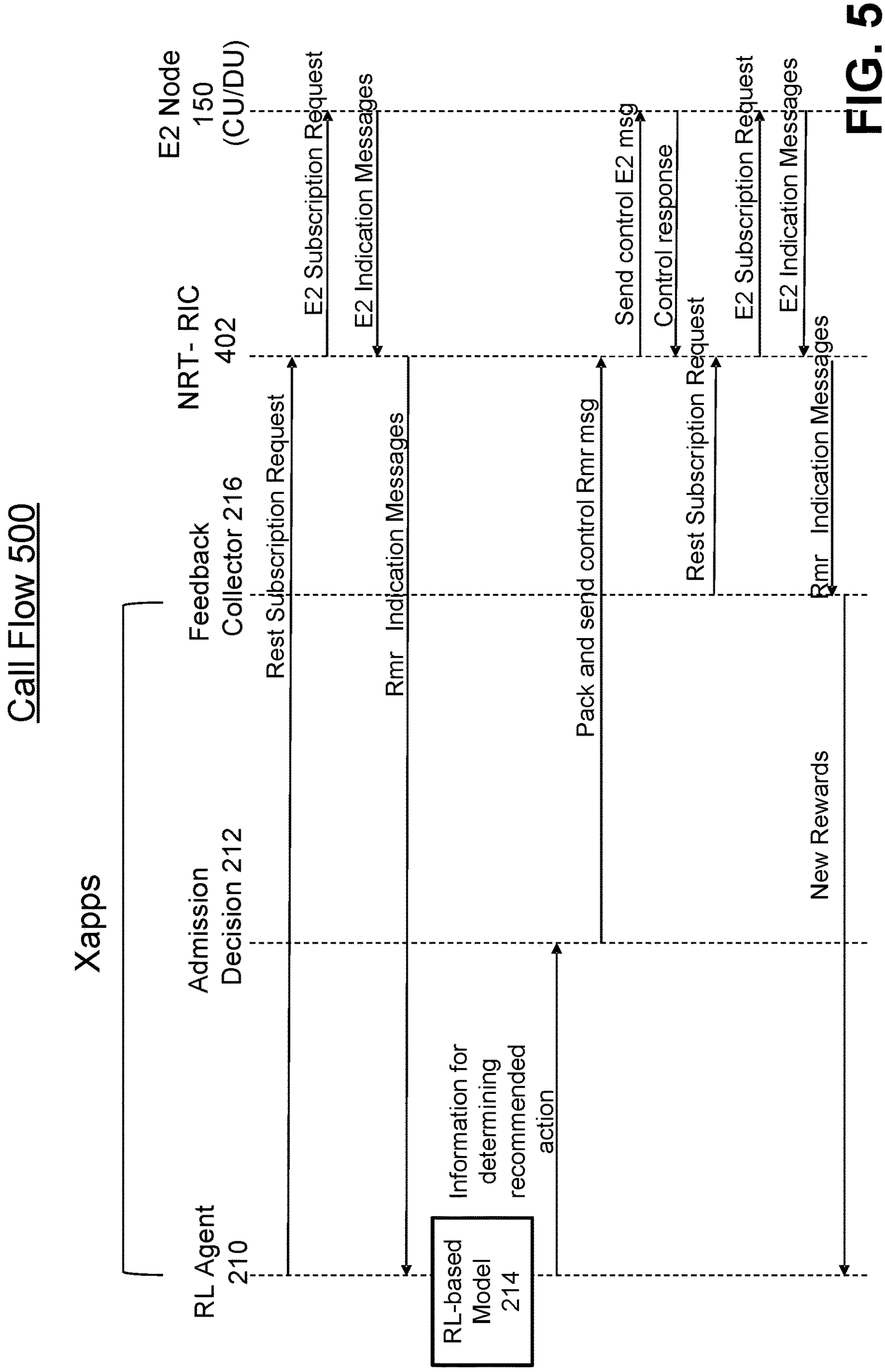
FIG. 5 illustrates a flow diagram of a set of call flow processes performed by the network admission control system of FIG. 2 in connection with the private network of FIG. 1, in accordance with one or more embodiments and/or implementations described herein.

Next, prior to detailed description and discussion of the modules of the network admission control system 200, direction first turns to the schematic diagram 400 of FIG. 4, to the call flow 500 of FIG. 5, and to discussion of the interactions between the network admission control system 200 and the radio architecture 100 of the private network that result in execution of an action in response to a UE request for admission and in optimization of the network admission control system 200 for use in addressing future UE requests for admission. The call flow will be majoratively described relative to the schematic diagram 400, while the call flow 500 illustrates another representation of the schematic diagram 400 including specific call originators and terminations.

As illustrated at FIG. 4, in one or more embodiments, the network admission control system 200 can be at least partially disposed at, and/or operate in conjunction with, a near real time radio access network intelligent controller (near RT RIC) 402 of the respective radio system architecture 100. An E2 interface 410 can allow for communication between the near RT RIC 402 and the E2 node 150 (e.g., CU and DU E2 nodes).

As illustrated at FIGS. 4 and 5, a subscription request 412 can originate from the RL agent module 210 requesting subscription to one or more quality of service flows at the E2 node 150. This subscription request 412 can terminate at an NRT-RIC controller 402, which can then forward the subscription request to the CU/DU of the E2 node 150. In response, one or more indication messages 414 can be sent back to the NRT-RIC controller 402 and then forwarded to the RL agent module 210, which indication messages 414 can comprise information defining the quality of service flows, load parameters, network topology and/or KPI requirements of the QoS or admitted UEs and/or can comprise a response that subscription has been implemented. The KPI information can comprise packet delay, packet drop rate, packet loss rate, and/or packet data convergence protocol (PDCP) data volume measurements. These measurements can be split into subcounters per QoS level (e.g., mapped 5G QoS identifiers) and subcounters per supported single network slice selection assistance information (S-NSSAI).

The information received can be dynamic in that the information can continuously change due to connecting and disconnecting UEs of the various QoS flows. In connection with, or separately from, the subscription request 412, the RL agent module 210 also can request, by way of the NRT-RIC controller 402, a KPI report (via report request 418) defining a current state of the one or more QoS flows. In response, the KPI report can be returned (via one or more indication messages 420), by way of the NRT-RIC controller 402.

Based on analysis of the information received, the RL agent module 210 can determine a recommended action. It is noted that detailed description of the information analysis relating and how the recommended action is determined is provided below.

Based on a recommended action determined by the RL agent module 210, the admission decision module 212 can send a control message 416, which can be forward to the E2 node 150 by the NRT-RIC controller 402. In response, the E2 node can send a control response message back to the NRT-RIC controller 402.

In response to the control response message, and/or in response to execution of a control action by the E2 node (e.g., admission, rejection, re-direction), the feedback collector module 216 can send an additional subscription request message 412 to the E2 node 150, by way of the NRT-RIC 402, requesting information from the E2 node. This information requested can comprise information defining the quality of service flows, load parameters, network topology and/or KPI states of the QoS. This information respectively relates to the E2 node 150 after execution of the control action, and thus a response (e.g., indication message 414) received from the E2 node 150 can be employed by the feedback collector module 216 to diagnose a result of the action recommended by the RL agent module 210. Based on the diagnosis, the feedback collector module 216 can request optimization of a decision policy employed by the RL-based model 214 and/or send new reward function information to the RL agent module 210 and/or RL-based model 214.

Figure 6:
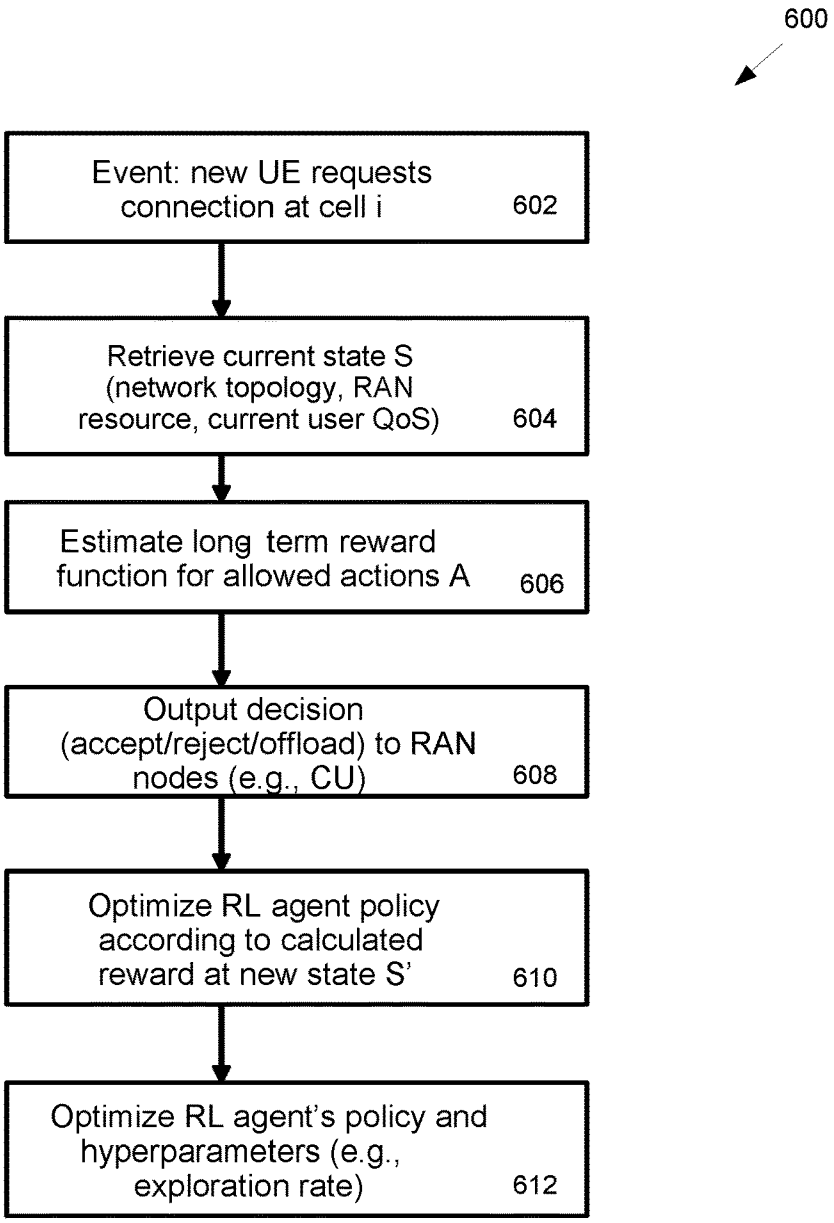
FIG. 6 illustrates a flow diagram of a set of processes that can be performed by the network admission control system of FIG. 2 in connection with responding to a UE request for admission, in accordance with one or more embodiments and/or implementations described herein.

Turning now to FIG. 6 in addition to FIG. 2, and to a detailed description of functioning of the different modules of the network admission control system 200, the RL agent module 210 can, based on receipt of a UE admission request from a UE 320 at step 602, send the aforementioned subscription request 412. Based on response information received from the E2 node 150 at step 604, such as a key performance indicator report, determine and analyze a set of network load parameters (e.g., number of UEs, channel conditions and/or physical resource block utilization levels) based on the E2 node's capabilities and a set of KPIs (e.g., packet delay, packet drop rate, packet loss rate and/or PDCP data volume measurements) based on one or more requirements and/or expectations related to one or more QoS flows of the E2 node 150 or related to one or more UEs admitted to and/or that employ the E2 node 150.

Using this information, the prediction process performed by the RL agent module 210 further can comprise defining a reward function that determines a quantified reward based on a level of satisfaction corresponding to at least one KPI for the E2 node 150 at step 606. That is, the intent of the reward function is to identify a load parameter that can be implemented to obtain a highest level of satisfaction possible of the KPI, thus resulting in a high reward for the prediction process. The reward function can be based on any one or more KPIs, such as selected by an administrator entity and/or by the network admission control system 200.

Based on the reward function determined from the RL agent module 210, the RL agent module 210 can further employ a decision process to determine one or more admission actions that can be recommended for implementation by the E2 node 150 to respond to the request for admission related to the user equipment 230. These admission actions can comprise at least one of admission of the requesting user equipment 230 to the private network, redirection of the user equipment 230 to the public network 250, non-admission of the user equipment 230 to the private network, and/or redirection of another user equipment 232 (e.g., already admitted to the private network) to the public network 250. It is noted that in one or more cases, decisions can be weighted against non-admission and/or rejection. In one or more additional and/or alternative cases, decisions may be weighted against redirection of a user equipment 232 already admitted to the private network.

Using an RL-based model 214, the RL agent module 210 can generate a set of one or more admission actions that can be predicted by the RL-based model 214 to maintain and/or increase (e.g., advance, make better) the QoS metric of interest of the private network upon which the reward function is based. The RL-based model 214 can be an analytical model that can employ artificial intelligence. This RL-based model 214 can be trained on simulated sets of load parameters, KPIs, quantified rewards and/or admission actions to, based on input of a current reward function, optimize the reward function, and thus optimize the selected KPI (e.g., QoS metric of interest). It is noted that generation, training and optimization of the RL-based model 214 are discussed below in detail.

That is, using the decision policy, one or more admission actions can be identified (e.g., by the RL-based model 214) that are predicted to achieve a load parameter threshold that is correlated to a determined level of satisfaction of the QoS metric. The level of satisfaction can be one that is at least equal to a current state (e.g., value) of the QoS metric or providing a better state (e.g., value) of the QoS metric than the current state of the QoS metric.

In one or more embodiments, where more than one admission action is determined by the RL-based model 214 and/or the RL-based model 214 can rank the generated admission actions and identify at least one for being recommended to the E2 node 150. The ranking can be based on level or reward and/or corresponding level of satisfaction of the QoS metric of interest.

In one or more embodiments, where no admission action is determined by the RL-based model 214 that maintains and/or advances the level of satisfaction of the QoS metric of interest, a best case or random admission action can be selected, such as by the RL-based model 214. A best case admission action can be one that provides a level of satisfaction of the QoS metric that is closest to the current state of the QoS metric. A random admission action can be employed based on simulated states of the node, upon which the RL-based model can be trained. In one more case, depending on the age of the RL-based model 214 (e.g., how long the RL-based model 214 has been deployed in a production environment) a degree of randomness of an action identified may be employed. The degree of randomness can be defined as an exploration rate (x) of reinforced learning of the RL-based model 214. In one or more embodiments, the exploration rate (x) can be dynamically varied according to the rewards (e.g., a reward average) received based on the actions recommended by the RL-based model 214. In this way, the RL-based model 214 can continue to learn (e.g., be optimized) based on feedback from a result of execution of the action, to be discussed below in detail.

Referring still to FIGS. 2 and 6, upon outputting of a control decision by the RL agent module 210, the admission decision module 212 can serve to transmit to the E2 node 150, and/or otherwise make available to the E2 node 150, the control decision at step 608.

In response to execution of the control decision, the feedback collector module 216 can request feedback from the E2 node 150, comprising data quantifying a state of the node after execution of the action. Based on a corresponding quantified reward determined to be associated with the execution of the control decision, or based on a random admission action, the feedback collector module 216 can optimize (and/or direct optimization of) the decision policy (e.g., action selection policy) employed by the RL-based model 214, to allow for achievement of a higher reward in future iterations of use of the RL-based model 214 (e.g., step 610).

Furthermore, as noted above, where no admission action is determined by the RL-based model 214 that maintains and/or advances the level of satisfaction of the QoS metric of interest, a best case or random admission action can be selected, such as by the RL-based model 214. Based on a corresponding quantified reward determined to be associated with the execution of the random admission action, the feedback collector module 216 can optimize (and/or direct optimization of) the decision policy (e.g., action selection policy) employed by the RL-based model 214, to adjust the degree of randomness (e.g., exploration rate) of the RL-based model 214 (e.g., step 612). In this way, the RL-based model 214 can continue to learn (e.g., be optimized) based on feedback from a result of execution of the action, to be discussed below in detail.

An exemplary case of reinforcement learning based delay-aware admission control is provided below, in the form of one or more steps employed by the RL-based model 214 in response to a request for admission by a new UE to the E2 node 150.

Upon arrival of a new user, the RL-based model 214 can calculate the new state and its reward assuming the user is admitted. In the below, x is the exploration rate and y is a selected threshold for measured reward minus predicted reward.

The reward value is checked, and the decision is taken as follows:

```
IF the reward of the new state is higher than the current system state OR
if
the algorithm is exploring new states with probability x,
   Then action a1 is applied (i.e., user is admitted)
   The reward is measured and stored for future usage
ELSE
   Action a0 is applied (i.e., the user is rejected)
ENDIF
```

The exploration parameter x is updated if there is a detected variation in the network conditions as follows:

```
IF (measured reward − predicted reward) > y
   Increase exploration (i.e., increase x)
ELSE
   Decrease exploration (i.e., decrease x)
END IF
```

As an outcome, the RL-based model 214 can calculate and store the reward of the current system state, for example at any suitable storage, such as memory 204.

Figure 7:
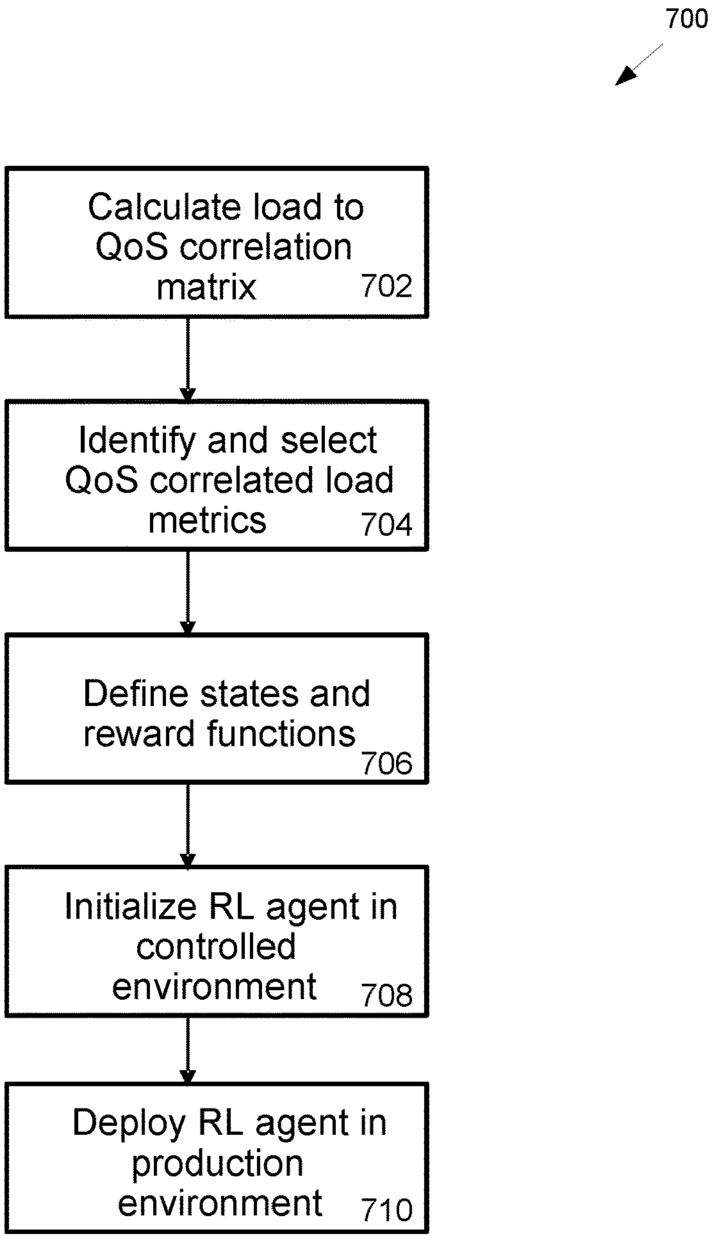
FIG. 7 illustrates a partial schematic diagram of a process performed by an admission control module of the network admission control system of FIG. 2 in connection with training of an reinforcement learning-based model, in accordance with one or more embodiments and/or implementations described herein.
Figure 8:
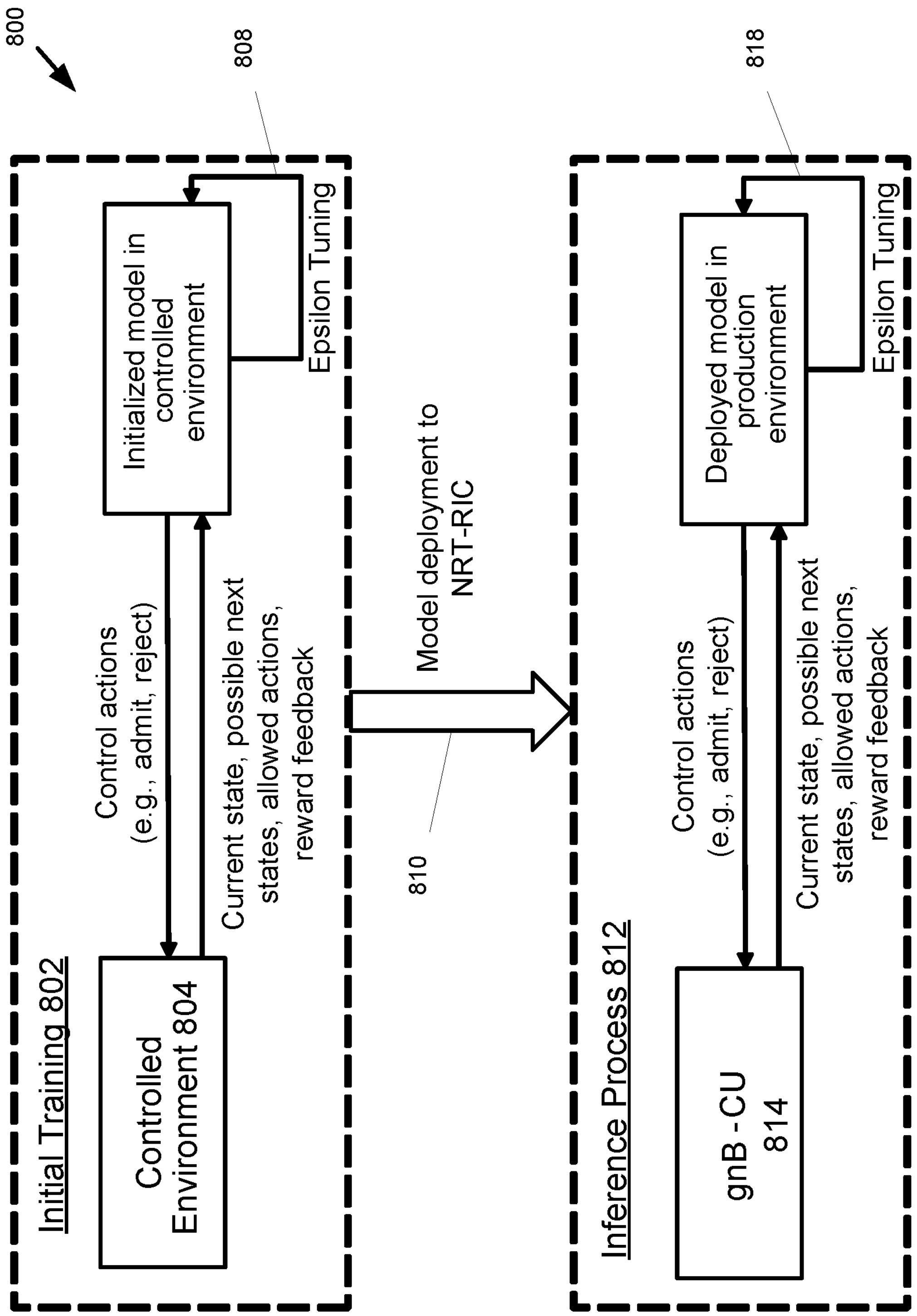
FIG. 8 illustrates a schematic diagram of a lifecycle of the reinforcement learning-based model employed by the network admission control system of FIG. 2, in accordance with one or more embodiments and/or implementations described herein.

Description next turns to generation and training of the RL-based model 214, and also to FIGS. 7 and 8. As mentioned above, the RL-based model 214 can be initially trained based on simulated sets of load parameters, KPIs, quantified rewards and/or admission actions. As illustrated at FIG. 7, the training process can comprise calculating load parameter to QoS correlations at step 702, which can be arranged in any suitable format, such as a data matrix. That is, the RL-based model 214 can, at step 704, determine closest correlations between one or more load parameters and one or more KPIs. This also can allow the RL-based model 214 to filter out one or more load parameters that are not closely related to certain QoS metrics (e.g., KPIs).

At step 706, during initialization (e.g., training), the RL-based model 214 can define KPI states and reward functions based on the correlations. As illustrated at FIG. 8, the initial training 802 can comprise deploying the RL-based model 214 to a controlled environment 804 (e.g., at step 708) for testing based on simulated inputs load parameters and KPIs, to output simulated admission actions for achieving simulated levels of satisfaction of the simulated KPIs. Optimization, e.g., epsilon tuning 808, can be employed based on feedback collected from the simulations as to whether the expected reward was or was not achieved. Upon policy convergence, and/or upon reaching a selected threshold of decision policy convergence, the RL-based model 214 can be deployed to a production environment at step 710, such as to be used for an inference process 812 at a next generation node B central unit (gNB-CU).

Referring now specifically to FIG. 8, an exemplary lifecycle 800 of the RL-based model 214 is illustrated to provide further information and summary. As shown, the lifecycle of the RL-based model 214 can be broken into two steps being initial training 802 and inference processing 812.

Initial training 802 can employ and/or correspond to steps 602-608 illustrated at FIG. 6 in a simulated or controlled environment 804. During such initial training 802, the RL-based model 214 can be initialized and trained based on a set of simulated states and rewards, along with simulated feedback resulting in policy tuning 808, until the decision policy employed by the RL-based model 214 matures. This can be based on a threshold applied to anyone or more of exploration rate and/or reward feedback. Reward quantification can be based on epsilon with a high epsilon value being used initially, where the epsilon value can be decreased corresponding to reward maximization.

Thereafter, the RL-based model 214 can be deployed in an NRT-RIC environment for the illustrated inference processing 812 (e.g., as explained above). In the inference phase, the RL-based model 214 can be deployed and used to send control actions to the gnB-CU (e.g., of and/or associated with the corresponding E2 node) while maintaining a real-time exploration routine (e.g., tuning epsilon based on performance feedback as described above relative to the feedback collector module 216).

Figure 9:
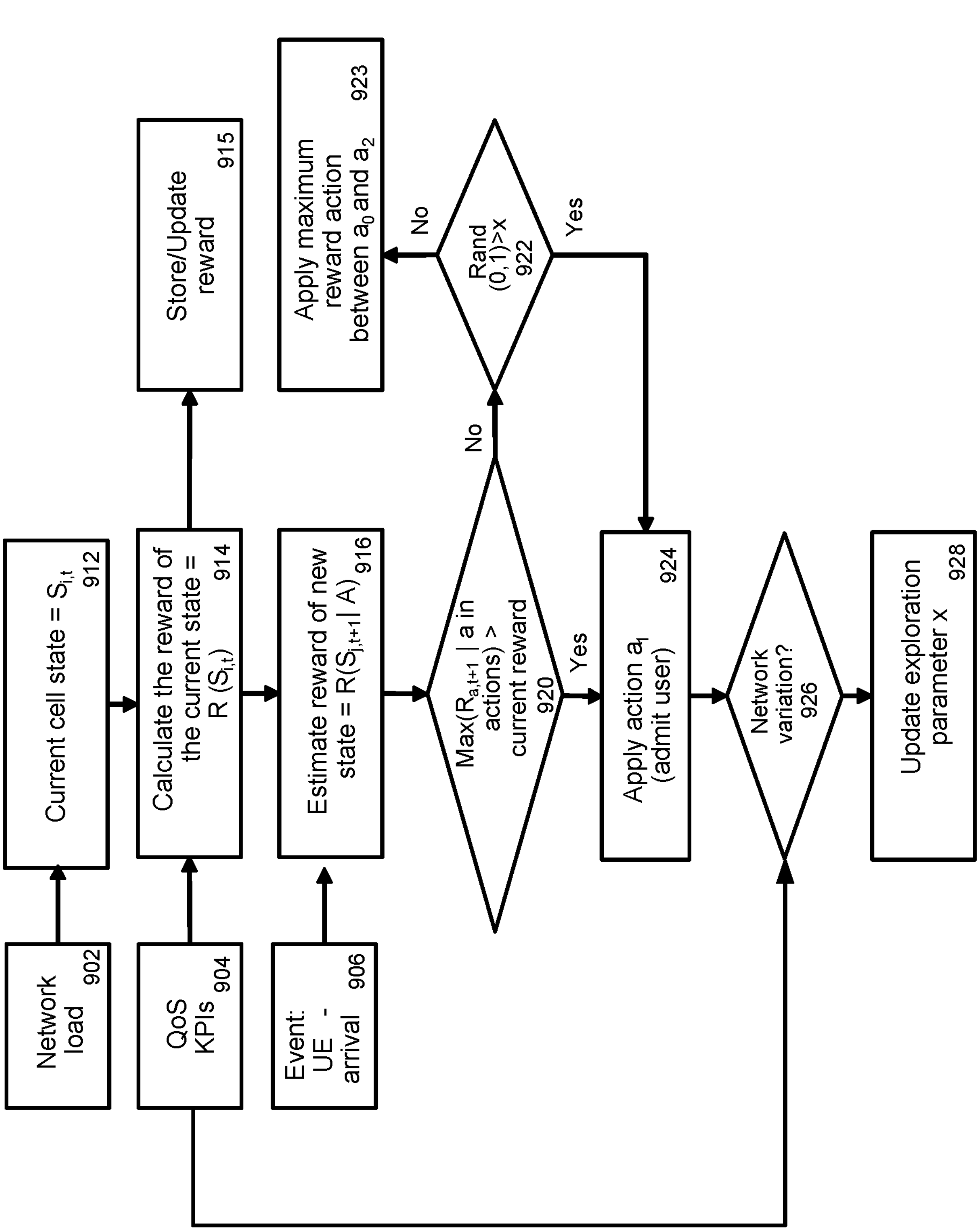
FIG. 9 illustrates a summarizing flow diagram of a set of processes that can be performed by the network admission control system of FIG. 2, in accordance with one or more embodiments and/or implementations described herein.

Referring now to FIG. 9, as a summary, illustrated is a flow diagram 900 defining the flow of procedures taken by the RL-based model 214 as part of inference processing 812 to determine the recommended action (e.g., control decision).

At FIG. 9, a state(S)={p, n, v, q}, where p is the PRB utilization on the serving cell, n is the number of served user entities, v is the traffic volume, and q is the current QoS measurement on the serving cell.

An action (A)={$a_0$=0, $a_1$=1, $a_2$=2}, where $a_0$=0 is reject, $a_1$=1 is admit, and $a_2$=2 is release or redirect to public network.

A reward $$(R) = \frac{n}{N} * \left( \sum_{u \in U} \frac{\max(0, d'_u - d_u)}{d'_u - d_u} * w_{+ve} - \sum_{u \in U} \frac{\min(0, d'_u - d_u)}{d'_u - d_u} * w_{-ve} \right),$$

where U is the set of users on current cell, n is the number of users in the state, N is the maximum number of allowed users, $d'_u$ is the maximum tolerable delay of user entity u, $d_u$ is the delay of user entity u in the state, $w_{+ve}$ is the weight assigned to measurements within acceptable range, and $w_{-ve}$ is the weight assigned to measurements violating acceptable range.

Further, at FIG. 9, x is the exploration parameter (between 0 and 1), and Rand (0,1) generates a pseudo random value between 0 and 1. The network load is represented by the current number of user entities (e.g., users) and QoS KPIs can comprise current packet delay defined in 3GPP, among other KPIs.

Examples of alternative states can be PRB utilization for each QoS flow or the average PRB utilization of each user. Examples of alternative rewards can be the delay of the new UE once admitted to the cell or the QoS degradation if the UE is rejection which considers a user-relative priority.

Examples of alternative per QoS reward functions are provided below:

Ultra-Reliable Low Latency Communications (URLLC) reward:

$$\frac{n}{N} * \left( \sum_{i \in n} \frac{\max(0, d'_i - d_i)}{d'_i - d_i} * w_{+ve} - \sum_{i \in n} \frac{\min(0, d'_i - d_i)}{d'_i - d_i} * w_{-ve} \right),$$

and

Enhanced mobile broadband (eMBB) reward:

$$\frac{n}{N} * \left( \sum_{i \in n} \frac{\max(0, t_i - t'_i)}{t_i - t'_i} * w_{+ve} - \sum_{i \in n} \frac{\min(0, t_i - t'_i)}{t_i - t'_i} * w_{-ve} \right).$$

First, the network load parameters (input 902), available through the indication messages, are used to construct the current cell state (step 912). Next, the QoS KPIs (input 904) of existing UEs are used to calculate the current reward value (in the current state), to be compared later to the potential actions to be taken (step 914). The reward can be stored at step 915, or a stored reward updated, also at step 915. Following, the RL-based model 214 can estimate the reward of admitting the incoming UE (input 906) in the current state and compares it to the current reward (non-admission of the incoming UE (step 916). A randomly generated number between 0 and 1 is generated and compared to the exploration rate x at step 920. If the randomly generated number is larger, the incoming UE is directly admitted (introducing exploration of admitting new users to the network) at step 924. Otherwise, at step 922, the RL agent recommends the action with the highest expected reward. That is, if the randomly generated number (Rand) is greater than s, the RL-based model 214 proceeds to admit the UE at step 924. If the Rand is not greater than x, the RL-based model 214 proceeds to apply a maximum reward action (e.g., a random action) employing the current exploration rate (at step 923).

After outputting the decision to the admission decision module 212, the RL agent module 210 can analyze the network KPIs (new input 904 as a result of execution of the recommended action by the E2 node) for variation in the KPIs patterns, and potentially increase the exploration rate x to increase the chance of learning an updated policy.

It is noted relative to FIG. 9 that the actions indicated as being taken by the RL-based model 214 further can be taken at least in part by the RL agent module employing the RL-based model 214.

Process Flows

Figure 10:
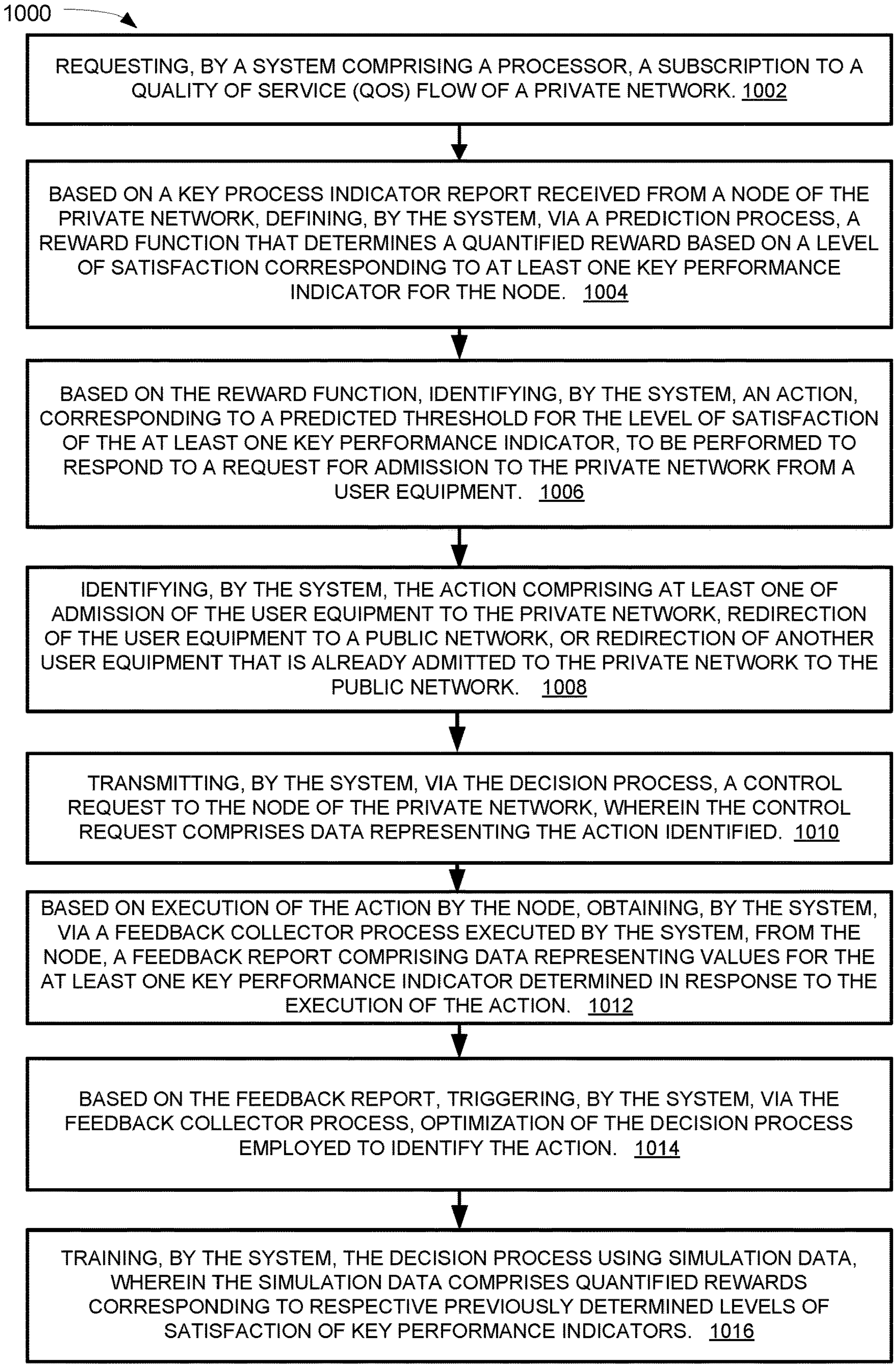
FIG. 10 illustrates a process flow diagram of a method of admission control by the network admission control system of FIG. 2, in accordance with one or more embodiments and/or implementations described herein.

Turning now to FIG. 10, a process flow comprising a set of operations is illustrated relative to FIG. 2 for determining whether to admit a user equipment to a private network and/or for addressing an outcome of a resultant admission decision. One or more elements, objects and/or components referenced in the process flow 1000 can be those of system 100 and/or system 200. Repetitive description of like elements and/or processes employed in respective embodiments is omitted for sake of brevity.

At operation 1002, the process flow 1000 can comprise requesting, by a system comprising a processor (e.g., RL agent module 210 of network admission control system 200), a subscription to a quality of service (QOS) flow of a private network.

At operation 1004, the process flow 1000 can comprise, based on a key process indicator report received from a node (e.g., E2 node 150) of the private network, defining, by the system (e.g., RL agent module 210), via a prediction process, a reward function that determines a quantified reward based on a level of satisfaction corresponding to at least one key performance indicator for the node.

At operation 1006, the process flow 1000 can comprise, based on the reward function, identifying, by the system (e.g., RL agent module 210), an action, corresponding to a predicted threshold for the level of satisfaction of the at least one key performance indicator, to be performed to respond to a request for admission to the private network from a user equipment (e.g., user equipment 230).

At operation 1008, the process flow 1000 can comprise identifying, by the system (e.g., RL agent module 210), the action comprising at least one of admission of the user equipment to the private network, redirection of the user equipment to a public network, or redirection of another user equipment that is already admitted to the private network to the public network.

At operation 1010, the process flow 1000 can comprise transmitting, by the system (e.g., admission decision module 212), via the decision process, a control request to the node of the private network, wherein the control request comprises data representing the action identified.

At operation 1012, the process flow 1000 can comprise, based on execution of the action by the node, obtaining, by the system (e.g., feedback collector module 216), via a feedback collector process executed by the system, from the node, a feedback report comprising data representing values for the at least one key performance indicator determined in response to the execution of the action.

At operation 1014, the process flow 1000 can comprise, based on the feedback report, triggering, by the system (e.g., feedback collector module 216), via the feedback collector process, optimization of the decision process employed to identify the action.

At operation 1016, the process flow 1000 can comprise training, by the system (e.g., RL agent module 210), the decision process using simulation data, wherein the simulation data comprises quantified rewards corresponding to respective previously determined levels of satisfaction of key performance indicators.

Figure 11:
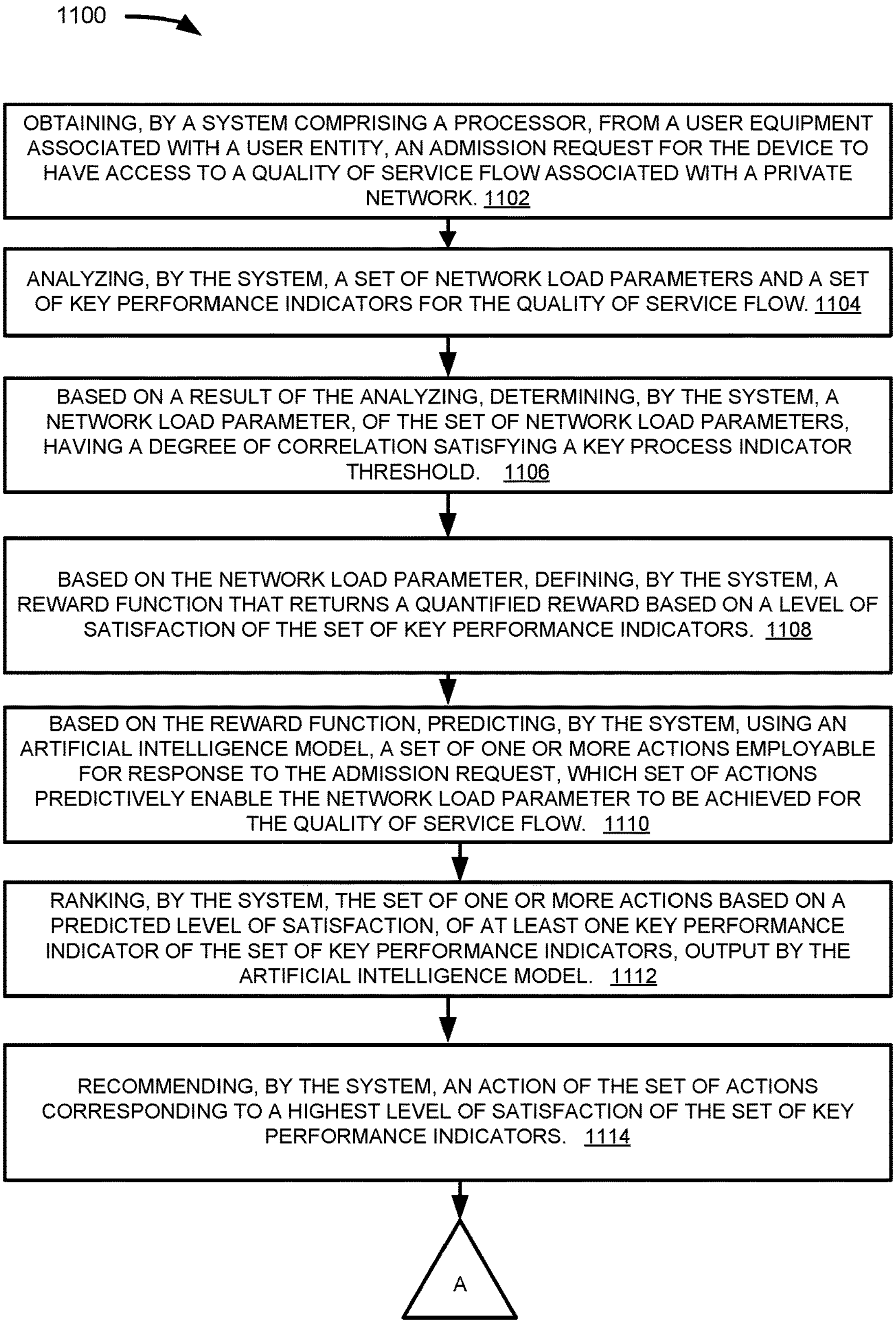
FIG. 11 illustrates another process flow diagram of a method of admission control by the network admission control system of FIG. 2, in accordance with one or more embodiments and/or implementations described herein.
Figure 12:
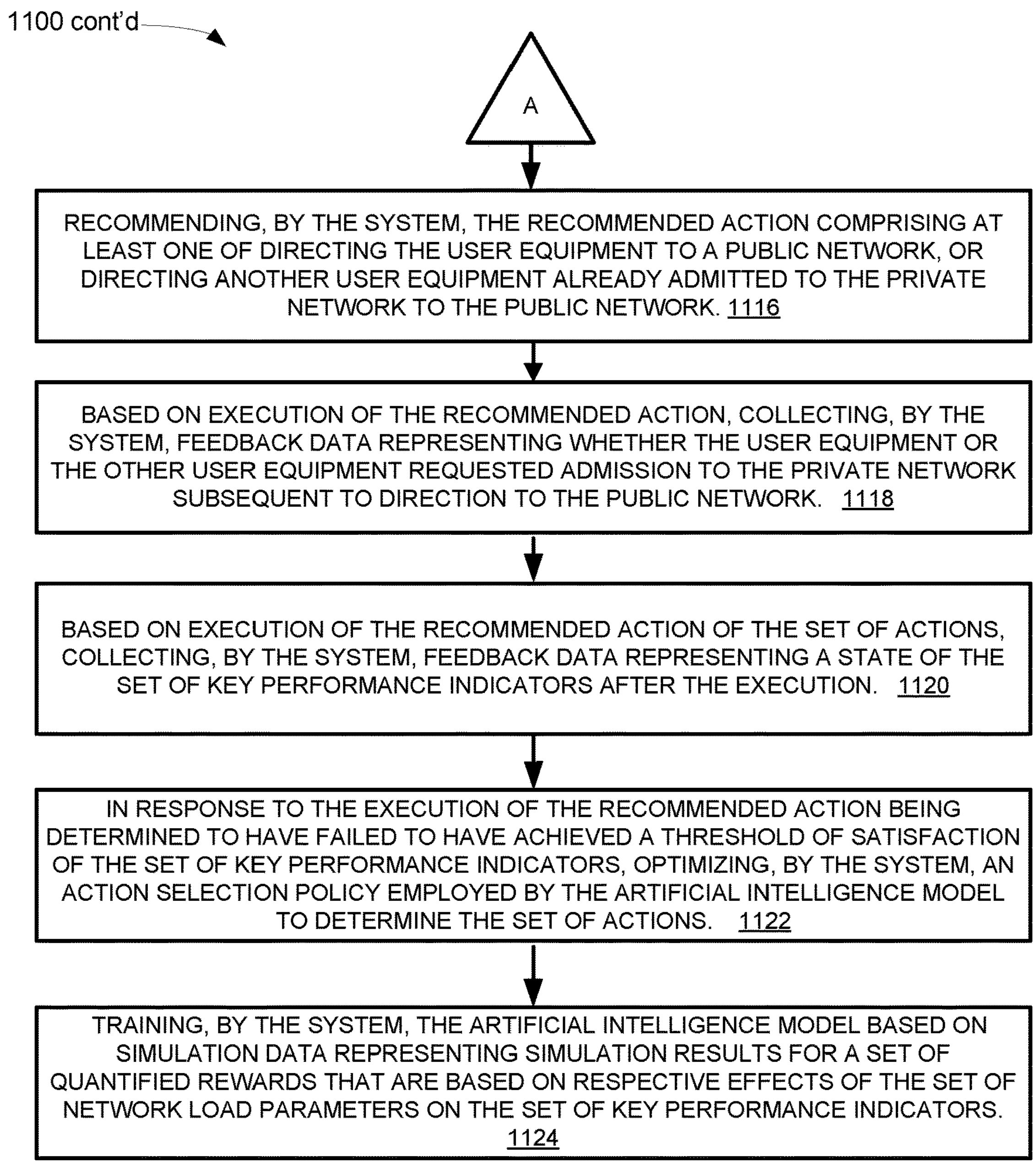
FIG. 12 illustrates a continuation of the process flow diagram of FIG. 11 of a method of admission control by the network admission control system of FIG. 2, in accordance with one or more embodiments and/or implementations described herein.

Turning now to FIGS. 11 and 12, a process flow comprising a set of operations is illustrated relative to FIG. 2 for determining whether to admit a user equipment to a private network and/or for addressing an outcome of a resultant admission decision. One or more elements, objects and/or components referenced in the process flow 1100 can be those of system 100 and/or system 200. Repetitive description of like elements and/or processes employed in respective embodiments is omitted for sake of brevity.

At operation 1102, the process flow 1100 can comprise obtaining, by a system comprising a processor (e.g., RL agent module 210 of network admission control system 200), from a user equipment (e.g., user equipment 230) associated with a user entity, an admission request for the device to have access to a quality of service flow associated with a private network.

At operation 1104, the process flow 1100 can comprise, analyzing, by the system (e.g., RL agent module 210), a set of network load parameters and a set of key performance indicators for the quality of service flow.

At operation 1106, the process flow 1100 can comprise, based on a result of the analyzing, determining, by the system (e.g., RL agent module 210), a network load parameter, of the set of network load parameters, having a degree of correlation satisfying a key process indicator threshold.

At operation 1108, the process flow 1100 can comprise, based on the network load parameter, defining, by the system (e.g., RL agent module 210), a reward function that returns a quantified reward based on a level of satisfaction of the set of key performance indicators.

At operation 1110, the process flow 1100 can comprise, based on the reward function, predicting, by the system (e.g., RL agent module 210), using an artificial intelligence model (e.g., RL-based model 214), a set of one or more actions employable for response to the admission request, which set of actions predictively enable the network load parameter to be achieved for the quality of service flow.

At operation 1112, the process flow 1100 can comprise, ranking, by the system (e.g., RL agent module 210), the set of one or more actions based on a predicted level of satisfaction, of at least one key performance indicator of the set of key performance indicators, output by the artificial intelligence model.

At operation 1114, the process flow 1100 can comprise, recommending, by the system (e.g., RL agent module 210), an action of the set of actions corresponding to a highest level of satisfaction of the set of key performance indicators.

At operation 1116, the process flow 1100 can comprise recommending, by the system (e.g., RL agent module 210), the recommended action comprising at least one of directing the user equipment to a public network or directing another user equipment already admitted to the private network to the public network.

At operation 1118, the process flow 1100 can comprise, based on execution of the recommended action, collecting, by the system (e.g., feedback collector module 216), feedback data representing whether the user equipment or the other user equipment requested admission to the private network subsequent to direction to the public network.

At operation 1120, the process flow 1100 can comprise, based on execution of the recommended action of the set of actions, collecting, by the system (e.g., feedback collector module 216), feedback data representing a state of the set of key performance indicators after the execution.

At operation 1122, the process flow 1100 can comprise, in response to the execution of the recommended action being determined to have failed to have achieved a threshold of satisfaction of the set of key performance indicators, optimizing, by the system (e.g., RL agent module 210), an action selection policy employed by the artificial intelligence model to determine the set of actions.

At operation 1124, the process flow 1100 can comprise, training, by the system (e.g., RL agent module 210), the artificial intelligence model based on simulation data representing simulation results for a set of quantified rewards that are based on respective effects of the set of network load parameters on the set of key performance indicators.

Figure 13:
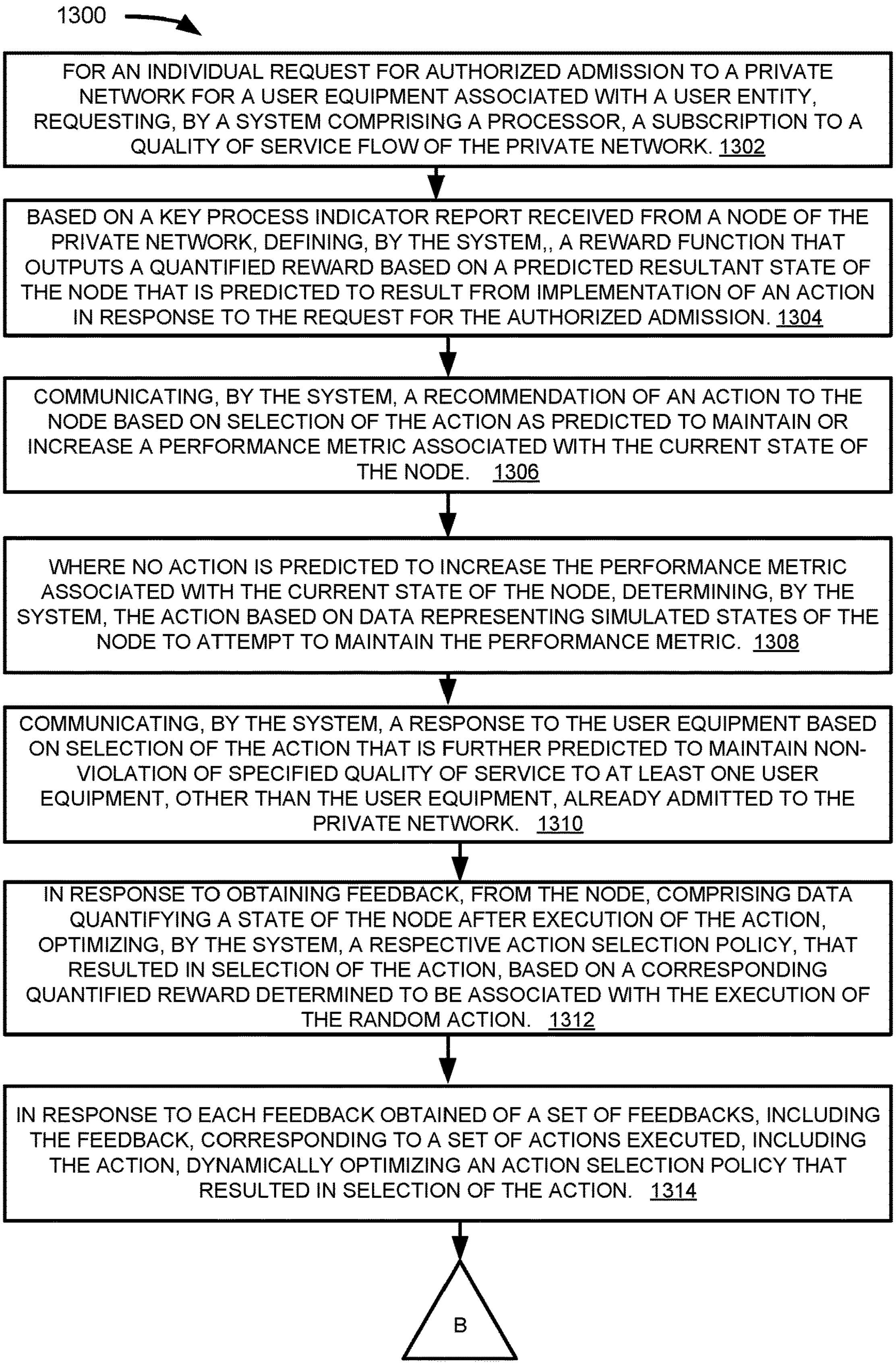
FIG. 13 illustrates still another process flow diagram of a method of admission control by the network admission control system of FIG. 2, in accordance with one or more embodiments and/or implementations described herein.
Figure 14:
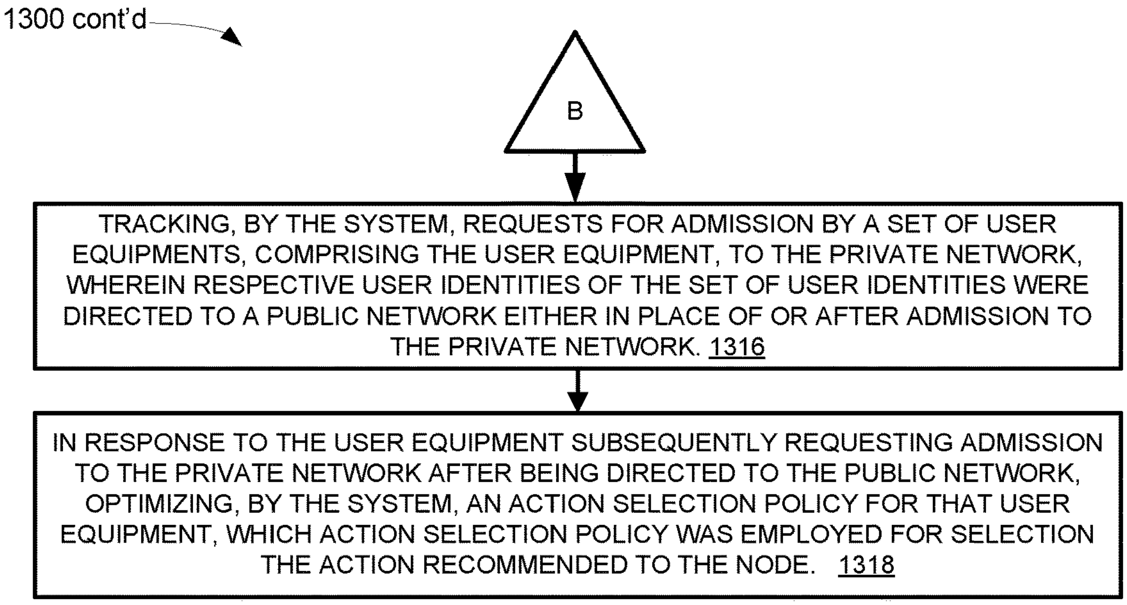
FIG. 14 illustrates a continuation of the process flow diagram of FIG. 13 of a method of admission control by the network admission control system of FIG. 2, in accordance with one or more embodiments and/or implementations described herein.

Turning now to FIGS. 13 and 14, a process flow comprising a set of operations is illustrated relative to FIG. 2 for determining whether to admit a user equipment to a private network and/or for addressing an outcome of a resultant admission decision. One or more elements, objects and/or components referenced in the process flow 1300 can be those of system 100 and/or system 200. Repetitive description of like elements and/or processes employed in respective embodiments is omitted for sake of brevity.

At operation 1302, the process flow 1300 can comprise, for an individual request for authorized admission to a private network for a user equipment associated with a user entity, requesting, by a system comprising a processor (e.g., RL agent module 210 of network admission control system 200), a subscription to a quality of service flow of the private network.

At operation 1304, the process flow 1300 can comprise, based on a key process indicator report received from a node of the private network, defining, by the system (e.g., RL agent module 210), a reward function that outputs a quantified reward based on a predicted resultant state of the node that is predicted to result from implementation of an action in response to the request for the authorized admission.

At operation 1306, the process flow 1300 can comprise communicating, by the system (e.g., admission decision module 212), a recommendation of an action to the node based on selection of the action as predicted to maintain or increase a performance metric associated with the current state of the node.

At operation 1308, the process flow 1300 can comprise, where no action is predicted to increase the performance metric associated with the current state of the node, determining, by the system (e.g., RL agent module 210 employing RL-based model 214), the action based on data representing simulated states of the node to attempt to maintain the performance metric.

At operation 1310, the process flow 1300 can comprise communicating, by the system (e.g., admission decision module 212), a response to the user equipment based on selection of the action that is further predicted to maintain non-violation of specified quality of service to at least one user equipment, other than the user equipment, already admitted to the private network.

At operation 1312, the process flow 1300 can comprise, in response to obtaining feedback, from the node (e.g., by the feedback collector module 216), comprising data quantifying a state of the node after execution of the action, optimizing, by the system (e.g., RL agent module 210), a respective action selection policy, that resulted in selection of the action, based on a corresponding quantified reward determined to be associated with the execution of the random action.

At operation 1314, the process flow 1300 can comprise, in response to each feedback obtained of a set of feedbacks, including the feedback, corresponding to a set of actions executed, including the action, dynamically optimizing, by the system (e.g., RL agent module 210), an action selection policy that resulted in selection of the action.

At operation 1316, the process flow 1300 can comprise tracking, by the system (e.g., feedback collector module 216), requests for admission by a set of user equipments, comprising the user equipment, to the private network, wherein respective user identities of the set of user identities were directed to a public network either in place of or after admission to the private network.

At operation 1318, the process flow 1300 can comprise, in response to the user equipment subsequently requesting admission to the private network after being directed to the public network, optimizing, by the system (RL agent module 210), an action selection policy for that user equipment, which action selection policy was employed for selection the action recommended to the node.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 1000, 1100 and 1300 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

Summary

In summary, technology described herein can employ dynamically changing network load parameters and/or key performance indicators to determine admission of one or more user entities to a private network. In an embodiment, a system comprises a processor and a memory that stores executable instructions that, when executed by the processor, facilitate performance of operations, comprising requesting, via a prediction process executed by the system, a subscription to a quality of service flow of a private network, based on a key performance indicator report received from a node of the private network, defining, via the prediction process, a reward function that determines a quantified reward based on a level of satisfaction corresponding to at least one key performance indicator for the node, and based on the reward function, identifying, via a decision process executed by the system, an action, corresponding to a predicted threshold for the level of satisfaction of the at least one key performance indicator, to be performed to respond to a request for admission to the private network from a user equipment.

As a result, the one or more embodiments of the aforementioned system, method and/or non-transitory machine-readable medium can allow for dynamic control of admission control, even for a private network, absent initial information defining user entities. This dynamic control can be performed individually per request for admission to the private network in a manner that can optimize (e.g., increase and/or maintain) a state of key performance indicators of a quality service flow of the network. such as when a network comprises multi-vendors and/or components of multi-vendors. Another advantage of these one or more processes can be a learned approach to admission control, absent use of static and fixed thresholds, thus accounting for dynamic conditions of a network and/or dynamic changes to user entity permissions, priorities and/or the like. Another advantage of these one or more processes can be dynamic control that is adapted to different permissions, priorities and/or the like of different user entities.

In one or more embodiments of the aforementioned system, method and/or non-transitory machine-readable medium a machine learning model, such as a reinforcement learning-based model, can be employed to predict a set of actions employable for response to the admission request by a user equipment (UE) associated with the user entity. The predicted set of actions can be those that are predicted to enable one or more selected network load parameters to be achieved for a quality of service flow of the private network.

An advantage of this system, method and/or non-transitory machine-readable medium can be an ability to leverage large quantities of simulated data for network load parameters corresponding to specified levels of resultant KPI's based on the network load parameters and to apply such simulated learning to dynamically changing real-time conditions on a per-QoS and/or per-UE admission request basis. This is in contrast to existing use of static occupancy quantities or static physical resource block (PRB) utilization levels which do not correlate to the asymmetric and aperiodic traffic patterns of current private networks, such as current 5G networks.

In one or more embodiments of the aforementioned system, method and/or non-transitory machine-readable medium a machine learning model, such as a reinforcement learning-based (RL-based) model, can be trained based on a simulated set of network parameters and a corresponding simulated set of KPIs. The RL-based model can be optimized based on dynamically changing states of real-time QoS flows of a private network to adjust the correspondences between the learned set of network parameters and the learned set of KPIs.

An advantage of this system, method and/or non-transitory machine-readable medium can be an ability to dynamically optimize a decision process (e.g., action selection process) employed to output the one or more predicted actions that can achieve a best reward for corresponding reward functions based on current, and dynamically changing, network parameters and KPIs. This dynamic optimization can allow for improvement to the system itself, allowing for achievement of higher rewards, which can be achieved on a per-QoS and/or per-UE basis.

A practical application of the systems, computer-implemented methods and/or non-transitory computer-readable mediums described herein can be efficient and intuitive admission control to a private network based on feedback of resulting states of the private network due to one or more actions executed based on the admission control. Overall, such computerized tools can constitute a concrete and tangible technical improvement in the field of admission control and/or admission control forecasting of a private network, without being limited thereto.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide dynamic and adaptable private network admission control, as compared to existing systems and/or techniques. Systems, computer-implemented methods and/or computer program products facilitating performance of these processes are of great utility in the fields of private network admission controls and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze network conditions and user entities, predict admissions decision results, and/or determine a dynamically controlled admission decision in the time that one or more embodiments described herein can facilitate these processes. And, neither can the human mind nor a human with pen and paper electronically perform one or more of these processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 15:
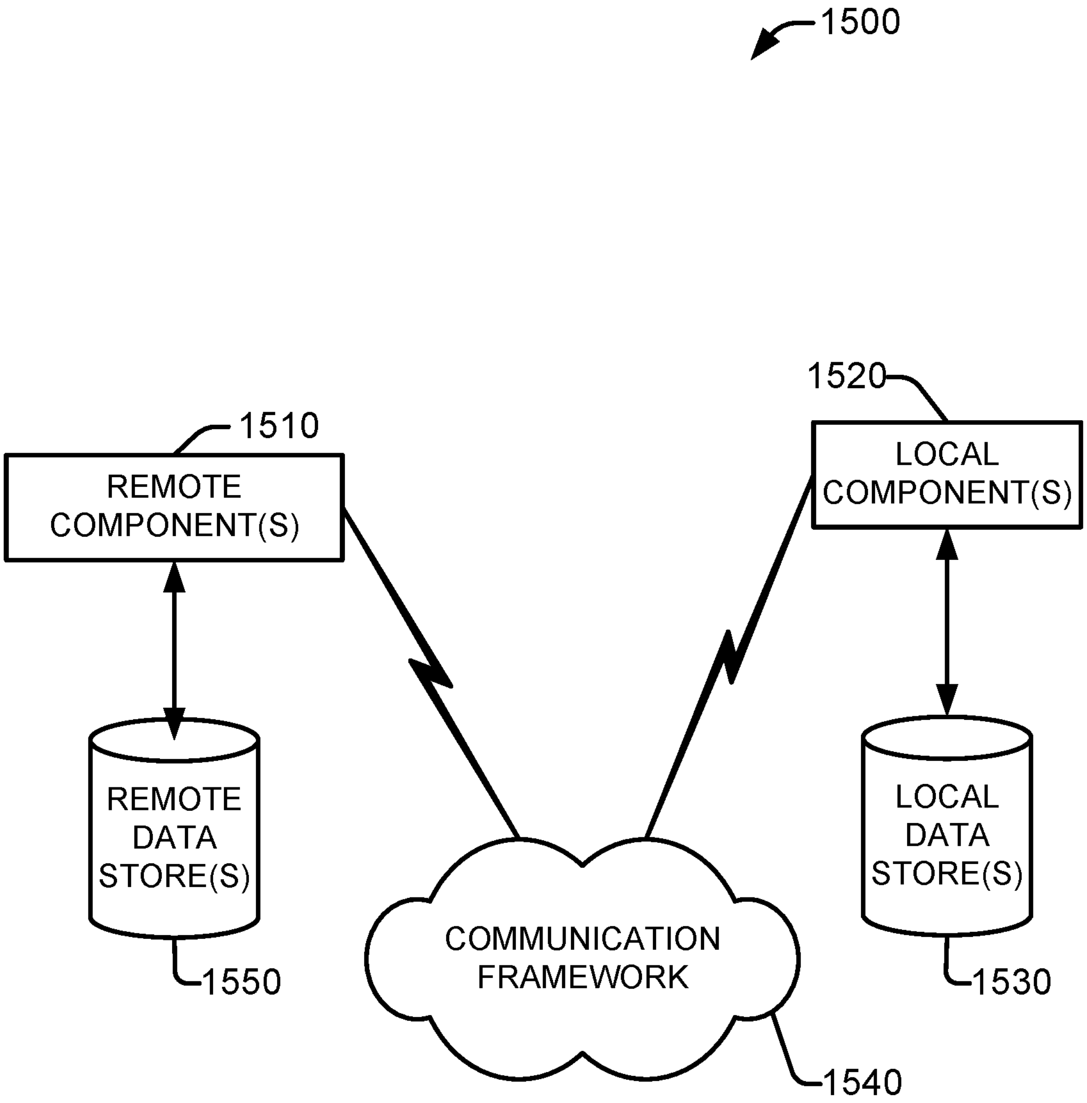
FIG. 15 illustrates a block diagram of an example operating environment into which embodiments of the subject matter described herein can be incorporated.

FIG. 15 is a schematic block diagram of an operating environment 1500 with which the described subject matter can interact. The operating environment 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The operating environment 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The operating environment 1500 comprises a communication framework 1540 that can be employed to facilitate communications between the remote component(s) 1510 and the local component(s) 1520, and can comprise an air interface, e.g., interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Example Computing Environment

Figure 16:
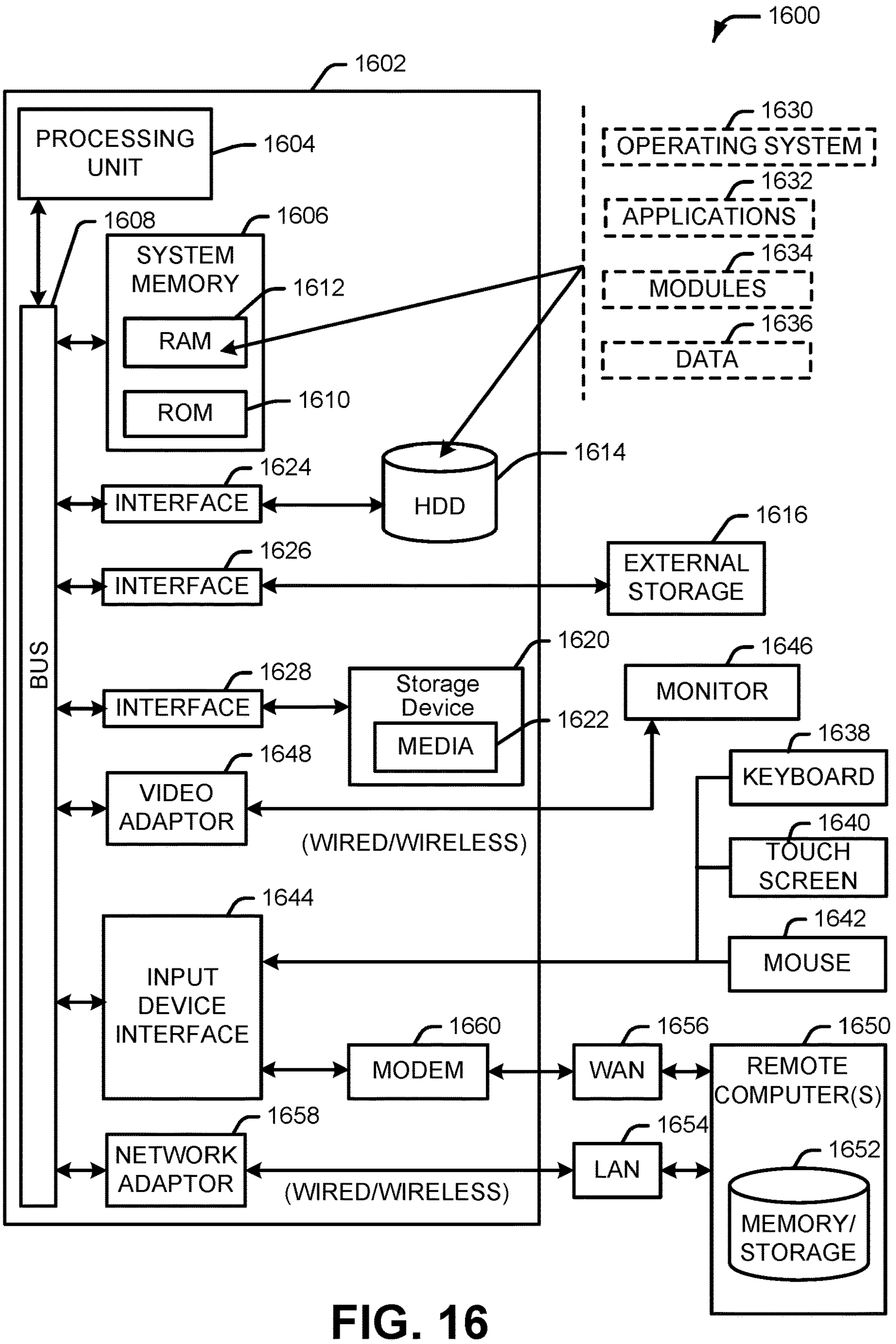
FIG. 16 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 16, the example computing environment 1600 which can implement one or more embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multiprocessor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM

1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), and can include one or more external storage devices 1616 (e.g., a magnetic floppy disk drive (FDD) 1616, a memory stick or flash drive reader, a memory card reader, etc.). While the internal HDD 1614 is illustrated as located within the computer 1602, the internal HDD 1614 can also be configured for external use in a suitable chassis (not shown). Additionally, while not shown in the computing environment 1600, a solid-state drive (SSD) could be used in addition to, or in place of, an HDD 1614.

Other internal or external storage can include at least one other storage device 1620 with storage media 1622 (e.g., a solid-state storage device, a nonvolatile memory device, and/or an optical disk drive that can read or write from removable media such as a CD-ROM disc, a DVD, a BD, etc.). The external storage 1616 can be facilitated by a network virtual machine. The HDD 1614, external storage device(s) 1616 and storage device (e.g., drive) 1620 can be connected to the system bus 1608 by an HDD interface 1624, an external storage interface 1626 and a drive interface 1628, respectively.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1602. e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can also be connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. The network connections shown are examples and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, comprising:

requesting, via a prediction process executed by the system, a subscription to a quality of service flow of a private network;

based on a key process indicator report received from a node of the private network, defining, via the prediction process, a reward function that determines a quantified reward based on a level of satisfaction corresponding to at least one key performance indicator for the node; and based on the reward function, identifying, via a decision process executed by the system, an action, corresponding to a predicted threshold for the level of satisfaction of the at least one key performance indicator, to be performed to respond to a request for admission to the private network from a user equipment, wherein the action comprises at least one of redirection of the user equipment to a public network or redirection of another user equipment, other than the user equipment, that is already admitted to the private network to the public network.

2. The system of claim 1, wherein the operations executed by the processor further comprise training the decision process using simulation data, and wherein the simulation data comprises quantified rewards corresponding to respective previously determined levels of satisfaction of key performance indicators.

3. The system of claim 1, wherein the operations executed by the processor further comprise:

transmitting, via the decision process, a control request to the node of the private network, wherein the control request comprises data representing the action identified.

4. The system of claim 1, wherein the operations executed by the processor further comprise:

based on execution of the action by the node, obtaining, via a feedback collector process executed by the system, from the node, a feedback report comprising data representing values for the at least one key performance indicator determined in response to the execution of the action.

5. The system of claim 4, wherein the operations executed by the processor further comprise:

based on the feedback report, triggering, via the feedback collector process, optimization of the decision process employed to identify the action.

6. The system of claim 1, wherein the operations executed by the processor further comprise:

based on execution of the action, collecting feedback data representing whether the user equipment or the other user equipment requested admission to the private network subsequent to direction to the public network.

7. A non-transitory machine-readable medium, comprising executable instructions that, when executed by at least one processor facilitate performance of operations, comprising:

obtaining, from a user equipment associated with a user entity, an admission request for the user equipment to have access to a quality of service flow associated with a private network;

analyzing a set of network load parameters and a set of key performance indicators for the quality of service flow;

based on a result of the analyzing, determining a network load parameter, of the set of network load parameters, having a degree of correlation satisfying a key process indicator threshold;

based on the network load parameter, defining a reward function that returns a quantified reward based on a level of satisfaction of the set of key performance indicators; and based on the reward function, predicting, using an artificial intelligence model, a set of one or more actions employable for response to the admission request, which set of actions predictively enable the network load parameter to be achieved for the quality of service flow; and based on execution of a recommended action of the set of one or more actions, collecting feedback data representing whether the user equipment or another user equipment requested admission to the private network subsequent to direction to the public network.

8. The non-transitory machine-readable medium of claim 7, wherein the operations executed by the processor further comprise:

training the artificial intelligence model based on simulation data representing simulation results for a set of quantified rewards that are based on respective effects of the set of network load parameters on the set of key performance indicators.

9. The non-transitory machine-readable medium of claim 7, wherein the operations executed by the processor further comprise:

ranking the set of one or more actions based on a predicted level of satisfaction, of at least one key performance indicator of the set of key performance indicators, output by the artificial intelligence model; and recommending, to a node of the private network, an action of the set of actions corresponding to a highest level of satisfaction of the set of key performance indicators, that action being the recommended action.

10. The non-transitory machine-readable medium of claim 7, wherein the recommended action comprises at least one of directing the user equipment to a public network, or directing the other user equipment already admitted to the private network to the public network.

11. The non-transitory machine-readable medium of claim 7, wherein the operations executed by the processor further comprise:

based on execution of the recommended action of the set of actions, collecting feedback data representing a state of the set of key performance indicators after the execution.

12. The non-transitory machine-readable medium of claim 11, wherein the operations executed by the processor further comprise:

in response to the execution of the recommended action being determined to have failed to have achieved a threshold of satisfaction of the set of key performance indicators, optimizing an action selection policy employed by the machine learning model to determine the set of actions.

13. The non-transitory machine-readable medium of claim 7, wherein the operations executed by the processor further comprise:

communicating a response to the user equipment based on selection of the recommended action that is further predicted to maintain non-violation of specified quality of service to at least one user equipment, other than the user equipment and comprising the other user equipment, already admitted to the private network.

14. A method, comprising:

for an individual request for authorized admission to a private network for a user equipment associated with a user entity, requesting, by a system comprising at least one processor, a subscription to a quality of service flow of the private network;

based on a key process indicator report received from a node of the private network, defining, by the system, a reward function that outputs a quantified reward based on a predicted resultant state of the node that is predicted to result from implementation of an action in response to the request for the authorized admission;

communicating, by the system, a recommendation of the action to the node based on selection of the action as predicted to maintain or increase a performance metric associated with the current state of the node; and in response to the user equipment being instead directed to a public network and subsequently requesting admission to the private network after being directed to the public network, optimizing, by the system, an action selection policy for the user equipment, which action selection policy was employed for selecting the action recommended to the node.

15. The method of claim 14, further comprising:

where the action is not predicted to increase the performance metric associated with the current state of the node, determining, by the system, the action based on data representing simulated states of the node to attempt to maintain the performance metric.

16. The method of claim 14, further comprising:

in response to obtaining feedback, from the node, comprising data quantifying a state of the node after execution of the action, optimizing, by the system, a respective action selection policy, that resulted in selection of the action, based on a corresponding quantified reward determined to be associated with the execution of a random action.

17. The method of claim 14, further comprising:

in response to each feedback obtained of a set of feedbacks, including the feedback, corresponding to a set of actions executed, including the action, dynamically optimizing, by the system, an action selection policy that resulted in selection of the action.

18. The method of claim 14, further comprising:

tracking, by the system, requests for admission by a set of user equipment, comprising the user equipment, to the private network, wherein respective user identities of the set of user identities, comprising the user identity, were directed to a public network either in place of or after admission to the private network.

19. The method of claim 14, further comprising:

communicating, by the system, a response to the user equipment based on selection of the action that is further predicted to maintain non-violation of specified quality of service to at least one user equipment, other than the user equipment, already admitted to the private network.

20. The method of claim 14, further comprising:

training, by the system, an artificial intelligence model based on simulation data representing simulation results for a set of quantified rewards that are based on respective effects of the set of network load parameters on the set of key performance indicators; and predicting, by the system, whether a set of one or more actions, comprising the action, if implemented, will at least maintain or increase the performance metric associated with the current state of the node.

* * * * *